United States Patent
Chendamarai Kannan et al.

(10) Patent No.: US 10,834,690 B2
(45) Date of Patent: Nov. 10, 2020

(54) STAGGERED SYNCHRONIZATION SIGNAL BLOCKS IN FREQUENCY SUB-BANDS FOR BEAMFORMED WIRELESS COMMUNICATIONS

(71) Applicant: QUALCOMM Incorporated, San Diego, CA (US)

(72) Inventors: Arumugam Chendamarai Kannan, San Diego, CA (US); Vinay Chande, San Diego, CA (US); Xiaoxia Zhang, San Diego, CA (US); Tao Luo, San Diego, CA (US); Jing Sun, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/777,326

(22) Filed: Jan. 30, 2020

(65) Prior Publication Data
US 2020/0252891 A1    Aug. 6, 2020

Related U.S. Application Data

(60) Provisional application No. 62/800,074, filed on Feb. 1, 2019.

(51) Int. Cl.
*H04W 72/04* (2009.01)
*H04W 56/00* (2009.01)
(Continued)

(52) U.S. Cl.
CPC ......... *H04W 56/001* (2013.01); *H04W 16/28* (2013.01); *H04W 24/08* (2013.01);
(Continued)

(58) Field of Classification Search
CPC ............................ H04W 56/01; H04W 72/042
See application file for complete search history.

(56) References Cited

U.S. PATENT DOCUMENTS

| 2018/0279237 A1 | 9/2018 | Kim et al. |
| 2019/0028315 A1 | 1/2019 | Park |
| 2020/0022041 A1* | 1/2020 | Ly .......................... H04W 48/20 |

OTHER PUBLICATIONS

Partial International Search Report—PCT/US2020/016268—ISAEPO—dated Apr. 24, 2020.
(Continued)

*Primary Examiner* — Sulaiman Nooristany
(74) *Attorney, Agent, or Firm* — Robert A. Reid; Holland & Hart LLP

(57) ABSTRACT

Methods, systems, and devices for wireless communications are described that provide staggered synchronization signal blocks (SSBs) in frequency sub-bands for beamformed wireless communications. Transmissions of SSBs and control channel transmissions (e.g., remaining minimum system information (RMSI) physical downlink control channel (PDCCH) transmissions) may use multiple transmission beams in a beam sweeping procedure. The SSB transmissions may be transmitted using transmission beams that span one frequency sub-band of a number of available frequency sub-bands, and the control channel transmissions may use transmission beams that span two or more of the frequency sub-bands. The SSB beam sweeping procedure may be performed separately during staggered, non-overlapping time periods for each frequency sub-band of the number of frequency sub-bands. Each of the of SSBs may indicate a reference timing of the base station used to identify a set of resources (e.g., a control resource set (CORESET)) that carries control channel transmissions.

28 Claims, 19 Drawing Sheets

(51) Int. Cl.
*H04W 16/28* (2009.01)
*H04W 74/08* (2009.01)
*H04W 24/08* (2009.01)

(52) U.S. Cl.
CPC ..... *H04W 72/042* (2013.01); *H04W 72/0453* (2013.01); *H04W 74/0808* (2013.01)

(56) References Cited

OTHER PUBLICATIONS

Samsung: "Remaining Details on Remaining Minimum System Information Delivery", 3GPP Draft, 3GPP TSG RAN WG1#90b, R1-1717578-RMSI Delivery V1, 3rd Generation Partnership Project (3GPP), Mobile Competence Centre, 650, Route Des Lucioles, F-06921 Sophia-Antipolis Cedex, France, vol. RAN WG1, No. Prague, Czech Republic, 20171009-20171013, Oct. 2, 2017 (Oct. 2, 2017), XP051352226, 9 Pages, Retrieved from the Internet: URL: http://www.3gpp.org/ftp/tsg_ran/VVG1_RL1/TSGR1_90b/Docs/, [retrieved on Oct. 2, 2017], the whole document.
International Search Report and Written Opinion—PCT/US2020/016268—ISA/EPO—dated Jul. 10, 2020.

\* cited by examiner

STAGGERED SYNCHRONIZATION SIGNAL BLOCKS IN FREQUENCY SUB-BANDS FOR BEAMFORMED WIRELESS COMMUNICATIONS

CROSS REFERENCE

The present Application for Patent claims the benefit of U.S. Provisional Patent Application No. 62/800,074 by CHENDAMARAI KANNAN et al., entitled "STAGGERED SYNCHRONIZATION SIGNAL BLOCKS IN FREQUENCY SUB-BANDS FOR BEAMFORMED WIRELESS COMMUNICATIONS," filed Feb. 1, 2019, assigned to the assignee hereof, and expressly incorporated by reference in its entirety.

BACKGROUND

The following relates generally to wireless communications, and more specifically to staggered synchronization signal blocks (SSBs) in frequency sub-bands for beamformed wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-s-OFDM). A wireless multiple-access communications system may include a number of base stations or network access nodes, each simultaneously supporting communication for multiple communication devices, which may be otherwise known as user equipment (UE).

In some cases, wireless devices (e.g., base stations, UEs, etc.) may use beamformed or precoded signals for transmission and/or reception of wireless communications. For example, a base station may utilize beamformed or precoded transmissions to provide directional transmissions that may mitigate path losses that may be experienced by non-beamformed or non-precoded transmissions which may have a relatively wide beam or omnidirectional transmission pattern. In some cases, a UE may monitor one or more beams as part of a beam sweeping procedure to identify a particular beam or beams that are suitable for beamformed communications between the UE and the base station. In some cases, the UE may obtain information for communicating with a base station from information provided via the beam sweeping procedure. Efficient techniques for identifying beams and associated information for communications may help enhance reliability and efficiency of a network utilizing beamforming.

SUMMARY

The described techniques relate to improved methods, systems, devices, and apparatuses that support staggered synchronization signal blocks (SSBs) in frequency sub-bands for beamformed wireless communications. Various techniques provide for transmissions of SSBs and control channel transmissions (e.g., remaining minimum system information (RMSI) physical downlink control channel (PDCCH) transmissions on a particular control resource set (CORESET)) via multiple transmission beams in a beam sweeping procedure. The SSB transmissions, in some cases, may be transmitted using transmission beams that span one frequency sub-band of a number of available frequency sub-bands, and the control channel transmissions may be transmitted using transmission beams that span two or more of the frequency sub-bands. In some cases, the SSB beam sweeping procedure is performed separately during staggered, non-overlapping time periods for each non-overlapping frequency sub-band of the number of frequency sub-bands. In some cases, each of the of SSBs indicates a reference timing of the base station that is used to identify a set of resources that carry the control channel transmissions.

In some cases, a base station transmitting the SSBs and control channel transmissions may perform a listen-before-talk (LBT) procedure prior to transmitting the SSBs and the control channel transmissions. In some cases, the SSBs may be transmitted in LBT-free transmissions. In cases where the SSBs are transmitted after an LBT procedure, an SSB time window may be identified, and the SSBs transmitted during the SSB time window. In some cases, a number of quantized starting locations are available within the SSB time window at which the base station may start the SSB beam sweeping procedure. In some cases, the SSB beam sweeping procedure may transmit SSBs on a predetermined sequence of transmission beams that starts upon completing the LBT procedure. In other cases, the SSB beam sweeping procedure may transmit SSBs on the predetermined sequence of transmission beams that starts at a timing boundary within the SSB time window.

A method of wireless communications at a user equipment (UE) is described. The method may include monitoring one or more of a set of frequency sub-bands for an SSB from a base station, where each of the set of frequency sub-bands carries a non-overlapping instance of the SSB, receiving a first instance of the SSB via at least a first frequency sub-band of the set of frequency sub-bands based on the monitoring, determining a reference timing of the base station based on one or more of information from the first instance of the SSB or a frequency location of the first frequency sub-band relative to a reference frequency sub-band of the set of frequency sub-bands, identifying, based on the reference timing, a set of resources for a control channel transmission from the base station, where the set of resources spans two or more of the set of frequency sub-bands, and receiving the control channel transmission via the set of resources.

An apparatus for wireless communications at a UE is described. The apparatus may include a processor, memory in electronic communication with the processor, and instructions stored in the memory. The instructions may be executable by the processor to cause the apparatus to monitor one or more of a set of frequency sub-bands for an SSB from a base station, where each of the set of frequency sub-bands carries a non-overlapping instance of the SSB, receive a first instance of the SSB via at least a first frequency sub-band of the set of frequency sub-bands based on the monitoring, determine a reference timing of the base station based on one or more of information from the first instance of the SSB or a frequency location of the first frequency sub-band relative to a reference frequency sub-band of the set of frequency sub-bands, identify, based on the reference timing, a set of resources for a control channel transmission from the base station, where the set of resources spans two or more of the set of frequency sub-bands, and receive the control channel transmission via the set of resources.

Another apparatus for wireless communications at a UE is described. The apparatus may include means for monitoring one or more of a set of frequency sub-bands for an SSB from a base station, where each of the set of frequency sub-bands carries a non-overlapping instance of the SSB, receiving a first instance of the SSB via at least a first frequency sub-band of the set of frequency sub-bands based on the monitoring, determining a reference timing of the base station based on one or more of information from the first instance of the SSB or a frequency location of the first frequency sub-band relative to a reference frequency sub-band of the set of frequency sub-bands, identifying, based on the reference timing, a set of resources for a control channel transmission from the base station, where the set of resources spans two or more of the set of frequency sub-bands, and receiving the control channel transmission via the set of resources.

A non-transitory computer-readable medium storing code for wireless communications at a UE is described. The code may include instructions executable by a processor to monitor one or more of a set of frequency sub-bands for an SSB from a base station, where each of the set of frequency sub-bands carries a non-overlapping instance of the SSB, receive a first instance of the SSB via at least a first frequency sub-band of the set of frequency sub-bands based on the monitoring, determine a reference timing of the base station based on one or more of information from the first instance of the SSB or a frequency location of the first frequency sub-band relative to a reference frequency sub-band of the set of frequency sub-bands, identify, based on the reference timing, a set of resources for a control channel transmission from the base station, where the set of resources spans two or more of the set of frequency sub-bands, and receive the control channel transmission via the set of resources.

In some examples of the method, apparatuses, and non-transitory computer-readable medium described herein, the monitoring may include operations, features, means, or instructions for monitoring two or more of the set of frequency sub-bands for respective instances of the SSB, and combining two or more instances of the SSB from the monitored two or more of the set of frequency sub-bands. Some examples of the method, apparatuses, and non-transitory computer-readable medium described herein may further include operations, features, means, or instructions for identifying a fixed time periodicity for monitoring the one or more of the set of frequency sub-bands for the SSB from the base station. In some examples of the method, apparatuses, and non-transitory computer-readable medium described herein, each of the set of frequency sub-bands carries an instance of the SSB that is non-overlapping in time and non-overlapping in frequency.

Some examples of the method, apparatuses, and non-transitory computer-readable medium described herein may further include operations, features, means, or instructions for identifying an SSB time window for monitoring the one or more of the set of frequency sub-bands for the SSB from the base station. In some examples of the method, apparatuses, and non-transitory computer-readable medium described herein, the SSB may be transmitted using an SSB beam sweeping procedure in which a series of consecutive transmission beams within each frequency sub-band each carry a corresponding SSB, and where a same initial transmission beam of the series of consecutive transmission beams is used irrespective of when the SSB beam sweeping procedure starts within the SSB time window.

In some examples of the method, apparatuses, and non-transitory computer-readable medium described herein, the SSB may be transmitted using an SSB beam sweeping procedure in which a series of consecutive transmission beams each carry a corresponding SSB having an SSB index that indicates a position of the SSB relative to a frame boundary within each frequency sub-band of the set of frequency sub-bands. In some examples of the method, apparatuses, and non-transitory computer-readable medium described herein, each instance of the SSB transmitted via each of the set of frequency sub-bands indicates a same set of CORESET resources for the control channel transmission from the base station, and where the control channel transmission is an RMSI PDCCH transmission.

In some examples of the method, apparatuses, and non-transitory computer-readable medium described herein, an SSB payload of each instance of the SSB indicates the reference timing of the base station relative to the respective instance of the SSB. In some examples of the method, apparatuses, and non-transitory computer-readable medium described herein, each frequency sub-band of the set of frequency sub-bands has a corresponding offset from the reference timing of the base station. Some examples of the method, apparatuses, and non-transitory computer-readable medium described herein may further include operations, features, means, or instructions for determining a frequency offset of the set of resources relative to the first frequency sub-band based on information provided by the first instance of the SSB.

In some examples of the method, apparatuses, and non-transitory computer-readable medium described herein, the set of resources includes a predetermined starting time resource for the control channel transmission relative to the reference frequency sub-band of the set of frequency sub-bands. In some examples of the method, apparatuses, and non-transitory computer-readable medium described herein, the set of resources includes a control channel time window during which the UE is to monitor for the control channel transmission. In some examples of the method, apparatuses, and non-transitory computer-readable medium described herein, a duration of the control channel time window may be based on an LBT procedure duration and a number of LBT attempts that the base station is configured to perform before dropping the control channel transmission.

A method of wireless communications at a base station is described. The method may include identifying a set of frequency sub-bands for transmitting a set of SSBs via a set of transmission beams in an SSB beam sweeping procedure, identifying a set of resources for transmitting a set of RMSI control channel transmissions via the set of transmission beams in an RMSI beam sweeping procedure, where the set of resources spans two or more of the set of frequency sub-bands, transmitting the set of SSBs via the set of transmission beams in the SSB beam sweeping procedure in each of the set of sub-bands, where the SSB beam sweeping procedure is performed separately during non-overlapping time periods for each frequency sub-band of the set of frequency sub-bands, and where each of the set of SSBs indicates a reference timing of the base station that is used to identify the set of resources, performing an LBT procedure for initiating the set of RMSI control channel transmissions, and transmitting, responsive to completing the LBT procedure, the set of RMSI control channel transmissions via the set of transmission beams in the RMSI beam sweeping procedure using the set of resources.

An apparatus for wireless communications at a base station is described. The apparatus may include a processor, memory in electronic communication with the processor, and instructions stored in the memory. The instructions may be executable by the processor to cause the apparatus to identify a set of frequency sub-bands for transmitting a set of SSBs via a set of transmission beams in an SSB beam sweeping procedure, identify a set of resources for transmitting a set of RMSI control channel transmissions via the set of transmission beams in an RMSI beam sweeping procedure, where the set of resources spans two or more of the set of frequency sub-bands, transmit the set of SSBs via the set of transmission beams in the SSB beam sweeping procedure in each of the set of sub-bands, where the SSB beam sweeping procedure is performed separately during non-overlapping time periods for each frequency sub-band of the set of frequency sub-bands, and where each of the set of SSBs indicates a reference timing of the base station that is used to identify the set of resources, perform an LBT procedure for initiating the set of RMSI control channel transmissions, and transmit, responsive to completing the LBT procedure, the set of RMSI control channel transmissions via the set of transmission beams in the RMSI beam sweeping procedure using the set of resources.

Another apparatus for wireless communications at a base station is described. The apparatus may include means for identifying a set of frequency sub-bands for transmitting a set of SSBs via a set of transmission beams in an SSB beam sweeping procedure, identifying a set of resources for transmitting a set of RMSI control channel transmissions via the set of transmission beams in an RMSI beam sweeping procedure, where the set of resources spans two or more of the set of frequency sub-bands, transmitting the set of SSBs via the set of transmission beams in the SSB beam sweeping procedure in each of the set of sub-bands, where the SSB beam sweeping procedure is performed separately during non-overlapping time periods for each frequency sub-band of the set of frequency sub-bands, and where each of the set of SSBs indicates a reference timing of the base station that is used to identify the set of resources, performing an LBT procedure for initiating the set of RMSI control channel transmissions, and transmitting, responsive to completing the LBT procedure, the set of RMSI control channel transmissions via the set of transmission beams in the RMSI beam sweeping procedure using the set of resources.

A non-transitory computer-readable medium storing code for wireless communications at a base station is described. The code may include instructions executable by a processor to identify a set of frequency sub-bands for transmitting a set of SSBs via a set of transmission beams in an SSB beam sweeping procedure, identify a set of resources for transmitting a set of RMSI control channel transmissions via the set of transmission beams in an RMSI beam sweeping procedure, where the set of resources spans two or more of the set of frequency sub-bands, transmit the set of SSBs via the set of transmission beams in the SSB beam sweeping procedure in each of the set of sub-bands, where the SSB beam sweeping procedure is performed separately during non-overlapping time periods for each frequency sub-band of the set of frequency sub-bands, and where each of the set of SSBs indicates a reference timing of the base station that is used to identify the set of resources, perform an LBT procedure for initiating the set of RMSI control channel transmissions, and transmit, responsive to completing the LBT procedure, the set of RMSI control channel transmissions via the set of transmission beams in the RMSI beam sweeping procedure using the set of resources.

In some examples of the method, apparatuses, and non-transitory computer-readable medium described herein, each of the SSBs may be transmitted according to a fixed time periodicity without performing an LBT procedure. Some examples of the method, apparatuses, and non-transitory computer-readable medium described herein may further include operations, features, means, or instructions for identifying an SSB time window for each of the set of frequency sub-bands for transmitting the set of SSBs and performing an LBT procedure during the SSB time window for each of the set of frequency sub-bands prior to transmitting the set of SSBs, where the set of SSBs are transmitted responsive to successfully completing the LBT procedure.

In some examples of the method, apparatuses, and non-transitory computer-readable medium described herein, a same initial transmission beam of the SSB beam sweeping procedure may be used irrespective of when the SSB beam sweeping procedure starts within the SSB time window. In some examples of the method, apparatuses, and non-transitory computer-readable medium described herein, each of the set of SSBs may have an associated SSB index that indicates a position of the SSB within a predetermined SSB pattern relative to a frame boundary within each frequency sub-band of the set of frequency sub-bands. In some examples of the method, apparatuses, and non-transitory computer-readable medium described herein, each of the SSBs transmitted via each of the set of frequency sub-bands indicates a same set of resources for the RMSI control channel transmissions. In some examples of the method, apparatuses, and non-transitory computer-readable medium described herein, an SSB payload of each of the SSBs indicates the reference timing of the base station relative to the respective SSB. In some examples of the method, apparatuses, and non-transitory computer-readable medium described herein, each frequency sub-band of the set of frequency sub-bands has a corresponding time offset from the reference timing of the base station. In some examples of the method, apparatuses, and non-transitory computer-readable medium described herein, each of the set of SSBs provides an indication of a frequency offset of the set of resources relative to a respective frequency sub-band of the set of frequency sub-bands used to transmit the SSB.

In some examples of the method, apparatuses, and non-transitory computer-readable medium described herein, the set of resources includes a predetermined starting time resource for the RMSI control channel transmission relative to a reference sub-band of the set of frequency sub-bands. In some examples of the method, apparatuses, and non-transitory computer-readable medium described herein, the set of resources may be associated with an RMSI time window during which the RMSI beam sweeping procedure is to be performed, and where a starting time of the RMSI beam sweeping procedure within the RMSI time window is dependent upon a time of completion of the LBT procedure for initiating the set of RMSI control channel transmissions. In some examples of the method, apparatuses, and non-transitory computer-readable medium described herein, a duration of the RMSI time window is based on a duration of the LBT procedure and a number of LBT attempts that the base station is configured to perform before dropping the set of RMSI control channel transmissions.

DETAILED DESCRIPTION

Figure 1:
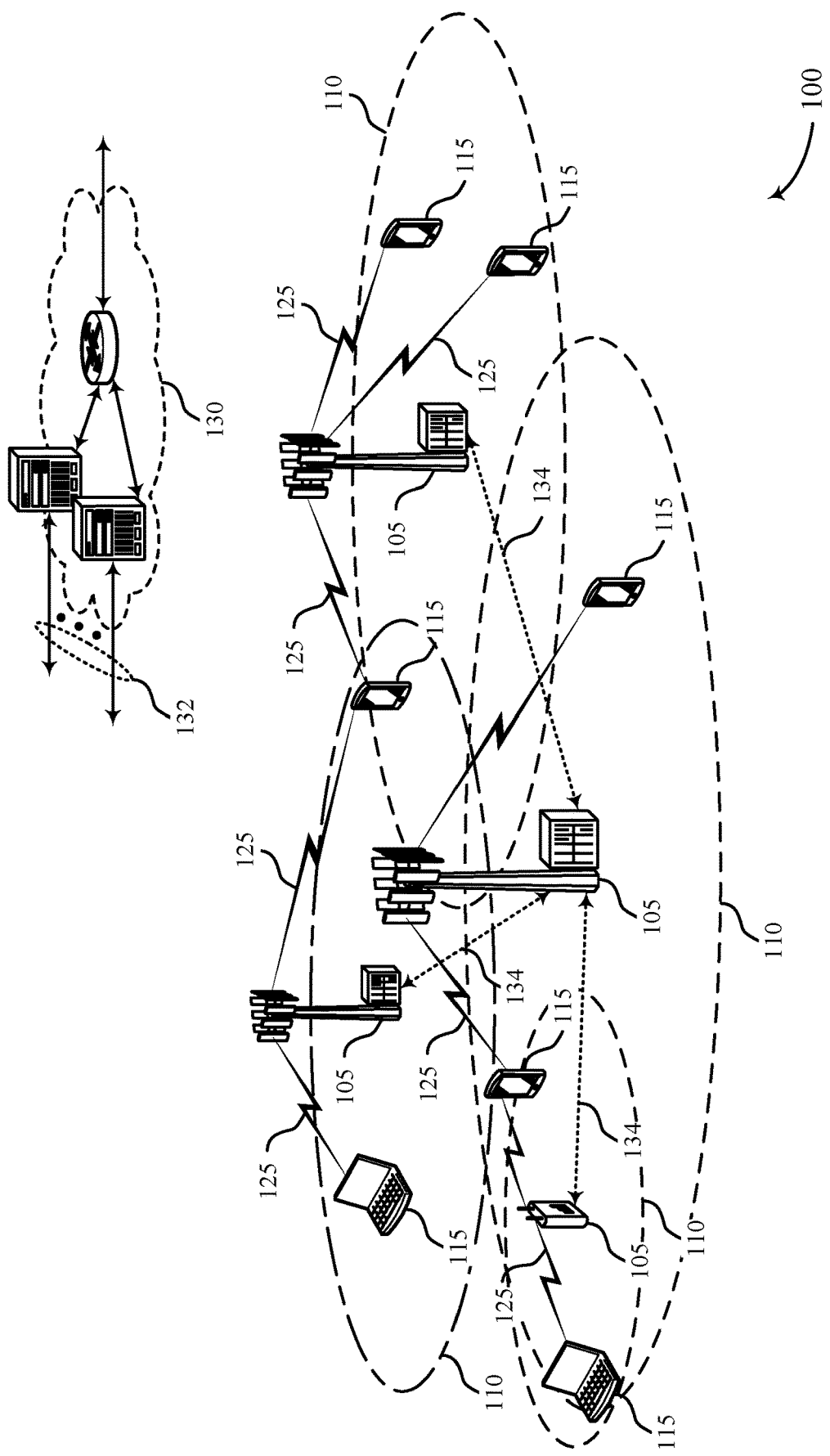
FIG. 1 illustrates an example of a wireless communications system that supports staggered synchronization signal blocks (SSBs) in frequency sub-bands for beamformed wireless communications in accordance with aspects of the present disclosure.

Aspects of the present disclosure relate to methods, systems, devices, and apparatuses that support initial access in beamformed communications between a user equipment (UE) and a base station. In some cases, a base station may transmit information for initiating an initial access procedure using beamformed communications in one or more beam sweeping procedures. In some cases, a first beam sweeping procedure may provide a discovery reference signal (DRS) (e.g., a synchronization signal block (SSB) having a primary synchronization signals (PSS), secondary synchronization signal (SSS), and physical broadcast channel (PBCH) with initial system information) via a set of beams transmitted using a frequency sub-band of a number of available frequency sub-bands. SSB transmissions, in some cases, may be transmitted using transmission beams that span one frequency sub-band of a number of available frequency sub-bands. In some cases, the first beam sweeping procedure may be performed separately during staggered, non-overlapping time periods for each frequency sub-band of the number of frequency sub-bands. In some cases, each of a number of SSBs transmitted in the beam sweeping procedure in each sub-band indicates a reference timing of the base station that is used to identify a set of resources (e.g., a control resource set (CORESET)) that carry control channel transmissions (e.g., remaining minimum system information (RMSI) physical downlink control channel (PDCCH) transmissions). In some cases, the control channel transmissions may provide a location of resources for a shared channel transmission of system information (e.g., an RMSI physical downlink shared channel (PDSCH) transmission that provides system information parameters).

A second beam sweeping procedure may provide the control channel transmissions (e.g., RMSI PDCCH transmissions in a CORESET indicated by the SSB) via the set of beams used in the first beam sweeping procedure, and that may be transmitted using multiple frequency sub-bands. In some cases, a listen-before-talk (LBT) procedure may be performed before one or both of the beam sweeping procedures, and transmissions initiated only when the LBT procedure indicates the one or more frequency bands are not occupied by other transmitters. In cases where an LBT procedure is used before the first beam sweeping procedure, a sequence of transmission beams may be established relative to when the LBT procedure is completed or relative to a timing boundary. A UE may monitor for transmissions of the first beam sweeping procedure and, based on the DRS, determine the CORESET resources to monitor for the control channel transmission (e.g., the RMSI PDCCH transmission). In some cases, the RMSI PDCCH transmission may provide a location of resources for an RMSI PDSCH transmission that provides system information parameters. The UE may initiate system access based on the DRS and received system information.

In some cases, a UE may monitor multiple frequency sub-bands to try and detect the DRS in the first beam sweeping procedure. In other cases, a UE may monitor only one frequency sub-band, or a subset of the multiple frequency sub-bands used in the first beam sweeping procedure. In some cases, a UE may monitor multiple frequency sub-bands and combine multiple instances of an SSB that is received via two or more of the monitored frequency sub-bands. In cases where the first beam sweeping procedure does not use LBT procedures, the base station may transmit the beams in accordance with a beam sequence of the first beam sweeping procedure, and a location of resources for the second beam sweeping procedure may be determined based on the transmission times in each frequency sub-band of the first beam sweeping procedure. In cases where the first beam sweeping procedure uses the LBT procedure, an SSB time window may be identified, and the beams of the first beam sweeping procedure transmitted in each sub-band during an associated SSB time window of each frequency sub-band. In some cases, a number of quantized starting locations are available within each SSB time window at which the base station may start the first beam sweeping procedure. In some cases, the first beam sweeping procedure may transmit SSBs on a predetermined sequence of transmission beams that starts upon completing the LBT procedure. In other cases, the first beam sweeping procedure may transmit SSBs on the predetermined sequence of transmission beams that starts at a timing boundary within the associated SSB time window.

In some cases, the second beam sweeping procedure may start at a fixed transmission time following the first beam sweeping procedure. In such cases, if an LBT procedure fails prior to the second beam sweeping procedure, the second beam sweeping procedure may be dropped and initiated again according to a periodicity associated with the second beam sweeping procedure. In some cases, a second time window associated with the second beam sweeping procedure may be identified and transmissions started within the second time window based on when the LBT procedure succeeds. In some cases, the control channel transmissions in the second beam sweeping procedure may span multiple frequency sub-bands. In some cases, the frequency sub-bands of the second beam sweeping procedure may be indicated by the base station in the first beam sweeping procedure (e.g., based on a synchronization sequence partition used for a synchronization signal transmitted in the first beam sweeping procedure, an explicit indication of a frequency offset, etc.).

Techniques as discussed herein may thus provide for efficient detection of system information for use in initial access procedures (e.g., in a random access channel (RACH) access procedure based on system information obtained in SSB and RMSI transmissions). In some cases, transmission of the SSBs in a first beam sweeping procedure using a single frequency sub-band may allow for increased power spectral density (PSD) of the SSB transmissions which may enhance the likelihood of detection at a UE. The control channel transmissions (e.g., RMSI PDCCH transmissions) in the second beam sweeping procedure may span additional frequency sub-bands and thus carry additional information relative to the SSB transmissions. The UE may identify beamforming characteristics for the second beam sweeping procedure based on the SSB, and thus transmission beams of the second beam sweeping procedure may have reduced PSD relative to the first beam sweeping procedure but still provide sufficient reliability of detection at the UE. Such techniques may thus enhance the efficiency and reliability of a wireless communications system through more efficient beamformed communications.

Aspects of the disclosure are initially described in the context of a wireless communications system. Several example resource configurations for SSB and RSMI beam sweeping procedures are then discussed. Aspects of the disclosure are further illustrated by and described with reference to apparatus diagrams, system diagrams, and flowcharts that relate to staggered SSBs in frequency sub-bands for beamformed wireless communications.

FIG. 1 illustrates an example of a wireless communications system 100 that supports staggered SSBs in frequency sub-bands for beamformed wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunications system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-s-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, one or more of the base stations 105 may use beamforming for communications with one or more UEs 115. In some cases, base stations 105 that use beamforming may transmit SSBs and RMSI via multiple transmission beams in a beam sweeping procedure. The SSB transmissions, in some cases, may be transmitted in an SSB beam sweeping procedure in which beam sweeping is performed separately during staggered, non-overlapping time periods for each frequency sub-band of the number of frequency sub-bands. In some cases, each of the of SSBs indicates a reference timing of the base station that is used to identify a set of resources (e.g., a CORESET) for RMSI PDCCH transmissions. In some cases, a base station 105 transmitting the SSBs and RMSI PDCCH transmissions may perform an LBT procedure prior to transmitting the SSBs and the RMSI PDCCH transmissions. In other cases, the SSBs may be transmitted in LBT-free transmissions.

Figure 2:
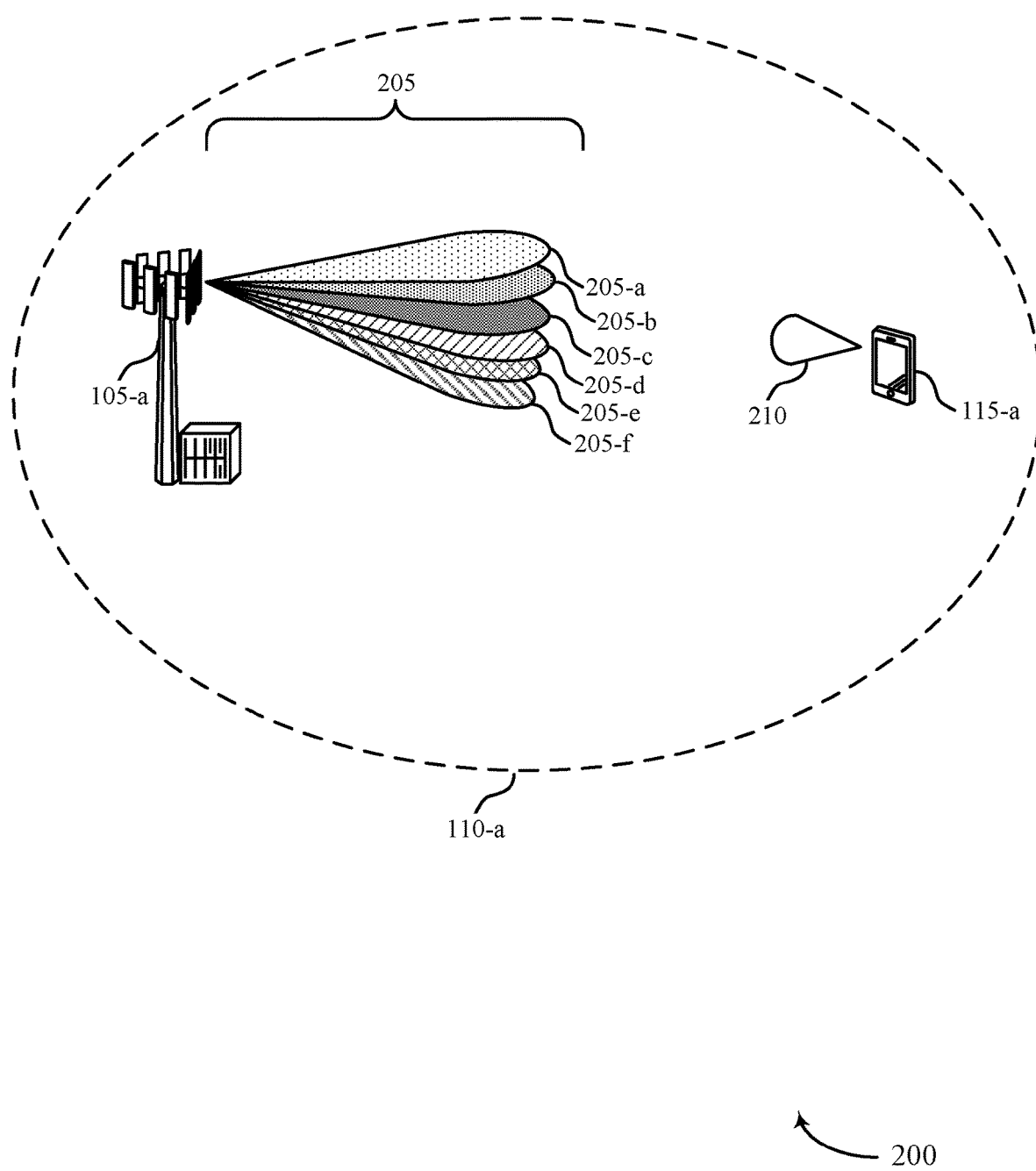
FIG. 2 illustrates an example of a portion of a wireless communications system that supports staggered SSBs in frequency sub-bands for beamformed wireless communications in accordance with aspects of the present disclosure.

FIG. 2 illustrates an example of a wireless communications system 200 that supports staggered SSBs in frequency sub-bands for beamformed wireless communications in accordance with aspects of the present disclosure. In some examples, wireless communications system 200 may implement aspects of wireless communications system 100. The wireless communications system 200 may include base station 105-a and UE 115-a, which may be examples of a base station 105 and a UE 115, as described with reference to FIG. 1.

Base station 105-a may provide network coverage for geographic coverage area 110-a. Base station 105-a and UE 115-a may communicate using beamformed or directional transmissions that carry uplink and downlink communications between the UE 115-a and the base station 105-a. When performing initial access, the UE 115-a may monitor (e.g., via a downlink or receive beam 210) for system information from the base station 105-a that may be transmitted via multiple transmission beams 205 in a beam sweeping procedure. In some cases, the UE 115-a may monitor for transmissions from the base station 105-a and identify one or more beams 205 that have channel characteristics that would support a connection (e.g., based on a reference signal received power (RSRP) or signal-to-noise ratio (SNR) associated with one or more detected transmission beams 205). In some cases, the UE 115-a and base station 105-a may use corresponding beamforming parameters associated with a particular transmission beam to configure receive hardware for transmitting/receiving beamformed transmissions in which a beam pair link may have coupled transmission beams with corresponding beamforming parameters. The beamforming parameters may include a particular spatial domain filter for uplink or downlink communications that is associated with a particular transmission beam. In cases with coupled transmission beams, the beamforming parameters of an uplink beam may be determined based on one or more reference signals that are received on a selected downlink beam 205 which is quasi co-located (QCL) with the uplink beam. Two antenna ports are said to be QCL if properties of the channel over which a symbol on one antenna port is conveyed can be inferred from the channel over which a symbol on the other antenna port is conveyed. In some cases, QCL may apply to a spatial receive parameter, which may be referred to as QCL-TypeD.

In some cases, base station 105-a may perform multiple beam sweeping procedures that provide system information that may be used by the UE 115-a in an initial access procedure. In some cases, the base station 105-a may transmit SSBs using transmission beams 205 in a first beam sweeping procedure and may transmit RMSI PDCCH transmissions using transmission beams 205 in a second beam sweeping procedure. The SSB transmissions, in some cases, may be transmitted in the beam sweeping procedure using transmission beams that span a first frequency sub-band of a number of available frequency sub-bands, followed by one or more additional transmissions in the beam sweeping procedure that span one or more additional frequency sub-bands of the available frequency sub-bands. The RMSI PDCCH transmissions may use transmission beams that span two or more of the frequency sub-bands.

Such transmissions using different frequency sub-bands may allow for the base station 105-a to transmit the SSBs at a relatively higher PSD that may enhance the detectability of the SSBs at the UE 115-a. In some cases, the transmission beams 205 may use relatively high frequency bands, such as high-band mmW frequencies in the 60-100 GHz range of frequencies (e.g., the "60 GHz band", which refers to 57-64 & 64-71 GHz bands). Such frequency bands may be unlicensed, and thus different transmitters may share the frequencies in accordance with established procedures that provide for fair access to the spectrum, such as LBT procedures. Additionally, such shared frequencies may also be characterized by relatively low transmit power limits (e.g., 13 dBm/MHz with a channelization of 2 GHz, with a maximum Effective Isotropic Radiated Power (EIRP) of 40 dBm; or an average EIRP of 40 dBm and a peak EIRP of 43 dBm). In some cases, such as in the 60 GHz band, up to seven channels of two GHz each may be present (i.e., in the 57-71 GHz range). However, in cases with a transmit power of 13 dBm/MHz, a total power of 46 dBm over 2 GHz, or a total power of 54.5 dBm over 14 GHz (for seven 2 GHz carriers), would exceed regulatory limits. Techniques such as discussed herein may provide for enhanced PSD for initial transmissions, while complying with such regulatory requirements. Further, in some cases, LBT may be necessary for such transmissions due to regulatory requirements, and techniques as discussed herein may provide for efficient detection of beamformed transmissions based on when LBT clears.

In some cases, beamforming may be used in such relatively high frequencies which may provide focused beams having a relatively narrow coverage area that may enhance the distance from the base station 105-a at which a signal may be received and also reduce the likelihood of an LBT failure due to the relatively narrow beam. Further, techniques such as discussed herein may provide enhanced and reliable detection of signals for initial system access. In some cases, the base station 105-*a* may transmit SSB transmissions using non-overlapping staggered beam sweeping transmissions in multiple frequency sub-bands, followed by a separate beam sweeping procedure in which the base station 105-*a* may transmit RMSI PDCCH transmissions using resources that may be determined by the UE 115-*a* based on the detected SSB transmission, in which the RMSI bandwidth may not match the SSB bandwidth and the timing of the RMSI PDCCH transmissions may float within a transmission window. Additionally or alternatively, the base station 105-*a* may transmit SSB transmissions in a floating SSB time window on each of the frequency sub-bands. Examples of such techniques are discussed with respect to FIGS. 3 through 6.

Figure 3:
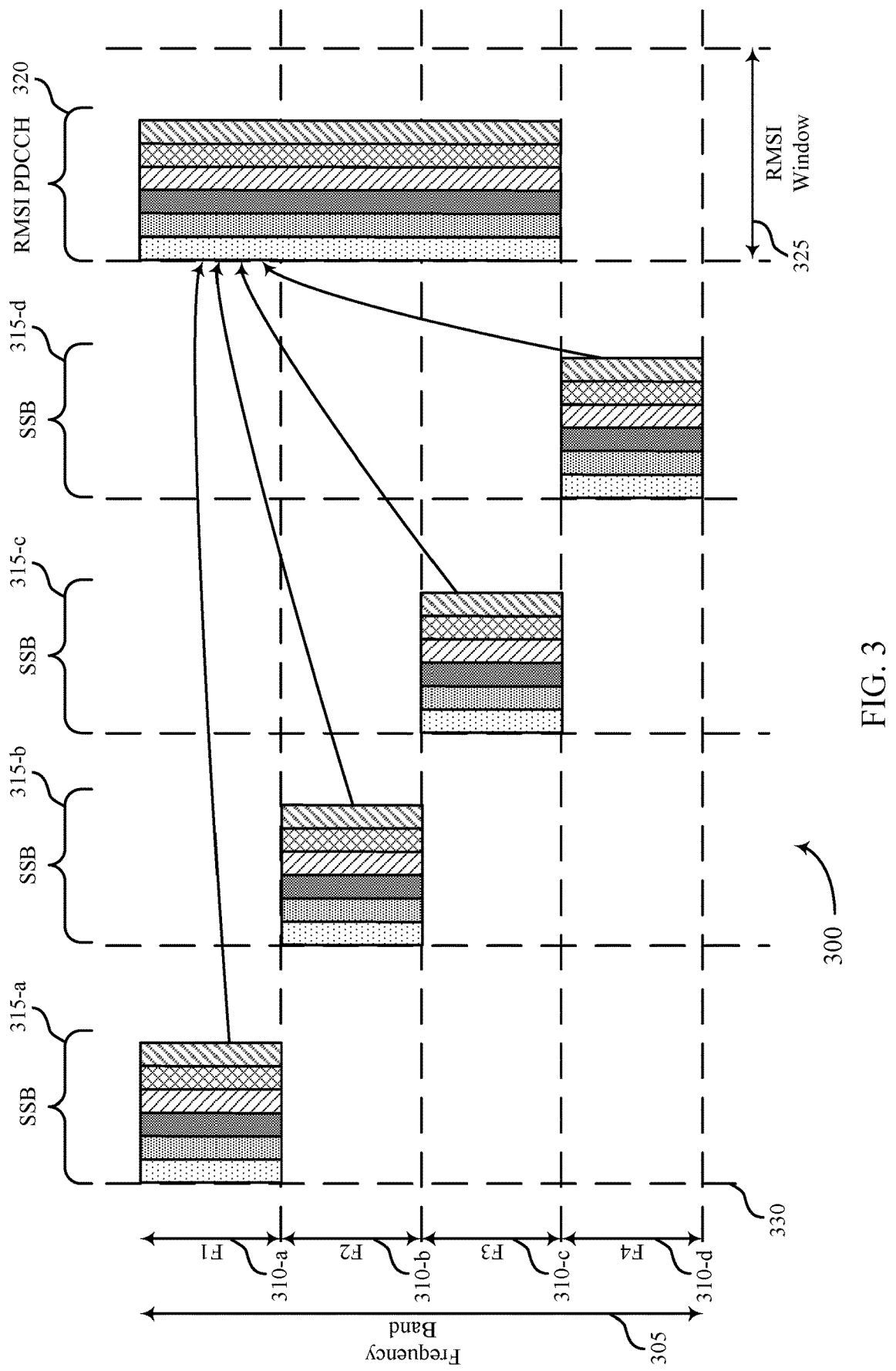
FIG. 3 illustrates an example of an SSB and RMSI resource configuration that supports staggered SSBs in frequency sub-bands for beamformed wireless communications in accordance with aspects of the present disclosure.

FIG. 3 illustrates an example of an SSB and RMSI resource configuration 300 that supports staggered SSBs in frequency sub-bands for beamformed wireless communications in accordance with aspects of the present disclosure. In some examples, SSB and RMSI resource configuration 300 may implement aspects of wireless communications system 100 or 200. In this example, a base station and UE (which may be examples of base stations 105 or UEs 115 of FIG. 1 or 2) may perform beamformed transmissions in a frequency band 305. In some cases, the frequency band 305 may be a high-band mmW frequency band.

In this example, a number of frequency sub-bands may be configured, including a first sub-band 310-*a* (F1), a second sub-band 310-*b* (F2), a third sub-band 310-*c* (F3), and a fourth sub-band 310-*d* (F4). While four frequency sub-bands 310 are illustrated in FIG. 3, other numbers of frequency sub-bands may be used, with the example of four sub-bands provided for purposes of illustration and discussion only. In this example, the base station may transmit a first instance of beamformed SSBs 315-*a* via an SSB beam sweeping procedure using the first frequency sub-band 310-*a*, a second instance of beamformed SSBs 315-*b* via the SSB beam sweeping procedure using the second frequency sub-band 310-*b*, a third instance of beamformed SSBs 315-*c* via the SSB beam sweeping procedure using the third frequency sub-band 310-*c*, and a fourth instance of beamformed SSBs 315-*d* via the SSB beam sweeping procedure using the fourth frequency sub-band 310-*d*.

In this example, each of the beamformed SSBs 315 may provide an indication of a same set of resources (e.g., a CORESET) for the RMSI beam sweeping procedure used to transmit a beamformed RMSI control channel transmissions 320 (e.g., RMSI PDCCH transmissions that may indicate resources for an RMSI PDSCH transmission that provides system information). In this example, the RMSI beam sweeping procedure of the beamformed RMSI control channel transmissions 320 may be transmitted during an RMSI window 325 via the same set of transmission beams as used for SSB beam sweeping procedure, but may be transmitted using frequencies that span the first frequency sub-band 310-*a* through the third frequency sub-band 310-*c*. In this example, SSBs 315 and RMSI control channel transmissions 320 may be transmitted according to a predetermined periodicity for purposes of providing detection by one or more UEs that may seek to gain network access. In such cases, additional instances of beamformed SSBs 315 may be transmitted followed by additional instances of beamformed RMSI control channel transmissions 320 that may span different frequency sub-bands than the SSB transmissions. While beamformed RMSI control channel transmissions 320 are illustrated as spanning three frequency sub-bands 310, such transmissions may span more or fewer frequency sub-bands in other cases.

In this example, the staggered SSBs 315 may thus be cycled through each of the multiple predefined frequency sub-bands 310. In such a manner, as one SSB 315 is transmitted at a time in one associated frequency sub-band 310, the PSD of the SSB 315 transmissions may be maximized for each frequency sub-band 310 and transmissions of SSBs 315 are not limited to one sub-band 310. In some cases, each of the SSBs 315 may provide a timing indication that indicates a timing associated with the RMSI control channel transmission 320 resources and may also provide a frequency indication that indicates a frequency associated with the RMSI control channel transmission 320 resources. In the example of FIG. 3, each SSB 315 may indicate system timing relative to a reference timing that is defined as an SSB starting point 330 of a designated reference sub-band (e.g., the first frequency sub-band 310-*a*).

In some cases, SSBs 315 that are transmitted in each of the frequency sub-bands 310 may each include a PBCH payload that is associated with a time offset of the frequency sub-band 310 used to transmit the SSB 315. For example, the SSB PBCH may indicate T0 for the first frequency sub-band 310-*a*, may indicate T1 for the second frequency sub-band 310-*b*, may indicate T2 for the third frequency sub-band 310-*c*, and so on. Each of the different T0, T1, and T2 values may indicate a timing of the RMSI window 325 relative to the reference timing of the SSB starting point 330. Such techniques may allow the base station to change the order in which the frequency sub-bands 310 are cycled in an SSB beam sweeping procedure. In other examples, the PBCH payload of each SSB 315 may be the same, but the SSBs 315 may be interpreted differently (e.g., based on a predetermined timing offset associated with each frequency sub-band 310), which may allow for combining of PBCHs at a UE that can monitor multiple frequency sub-bands 310.

By transmitting the beamformed SSBs 315 using one frequency sub-band 310 at a time, the SSB PSD may be enhanced for that sub-band, which may enhance detectability at the UE. Further, all UEs seeking to access the base station may run a searcher at one or more of the frequency sub-bands 310 and detect an SSB 315 that is transmitted on that sub-band 310, and thus sub-band diversity of the SSBs 315 may further enhance SSB detectability. In some cases, a UE may monitor multiple of the sub-bands 310 and detect multiple instances of SSBs 315, which in some cases may be combined at the UE to further enhance detectability of the SSBs 315 at the UE. The beamformed RMSI control channel transmissions 320 may be transmitted using any of the frequency sub-bands 310. In some cases, the base station may select the frequency sub-bands 310 for the beamformed RMSI control channel transmissions 320 based on one or more channel metrics associated with each of the frequency sub-bands 310, such as a long term interference metric associated with LBT procedures performed at each sub-band 310.

In this example, the beamformed SSBs 315 may be transmitted with no LBT. In such cases, the beamformed SSBs 315 may comply with parameters for an LBT-free or LBT-exempt transmission. In other cases, the beamformed SSBs 315 may be transmitted using a reduced contention window LBT procedure (e.g., a Cat2 LBT) and in the event that the LBT fails, that particular instance of the beamformed SSBs 315 may be dropped. Further, in this example, the beamformed RMSI control channel transmissions 320 may be transmitted based on passing an LBT procedure. In some cases, as indicated above, the beamformed RMSI control channel transmissions 320 may be transmitted at a fixed time relative to the SSB starting point 330, and an instance of the RMSI control channel transmissions 320 may be dropped if LBT fails. In other cases, such as in the example shown in FIG. 3, an RMSI window 325 may be provided and the beamformed RMSI control channel transmissions 320 may be transmitted within the RMSI window 325 upon successful LBT completion (e.g., the successful completion of a Cat4 LBT procedure). In the example of FIG. 3., the beamformed RMSI control channel transmissions 320 may start at the beginning of the associated RMSI window 325, although in other cases such transmissions may start later within the RMSI window 325 once LBT clears. In such cases, a UE may search for the RMSI control channel transmissions 320 within the RMSI window 325, and may discontinue searching for the RMSI control channel transmissions 320 upon detection of RMSI or the expiration of the RMSI window 325. In some cases, the starting and ending points of the RMSI window 325 may be determined based on a receipt time of the particular transmission beam on which the SSB is detected by the UE and a timing offset indicated in the SSB (e.g., relative to a frame boundary or the SSB starting point 330).

As indicated in the example of FIG. 3, the beamformed RMSI control channel transmissions 320 may use different frequency sub-bands 310 than the SSBs 315. In some cases, the frequency location of the RMSI control channel transmissions 320 may be indicated by the SSBs 315. In some examples, a payload transmitted in the SSBs 315 (e.g., in a PBCH of the SSB) may provide an explicit frequency offset for the RMSI control channel transmissions 320. In other cases, the SSBs 315 may provide an implicit indication of the frequency offset for the RMSI control channel transmissions 320. For example, a sequence of one or more of the PSS or SSS of the SSBs 315 may be partitioned with different partitions mapped to different frequency offsets (e.g., 252 base station cell IDs may be mapped to 1008 PSS/SSS sequences to indicate one of four available frequency offsets). In other cases, RMSI control channel transmissions 320 may also be fixed in predetermined frequency sub-bands 310, which may reduce flexibility of a base station to select sub-bands that may be more favorable. The information from the beamformed SSBs 315 and the beamformed RMSI control channel transmissions 320 may be used by a UE to determine resources and timing for transmission of a random access request to the base station to initiate system access, in some cases.

Figure 4:
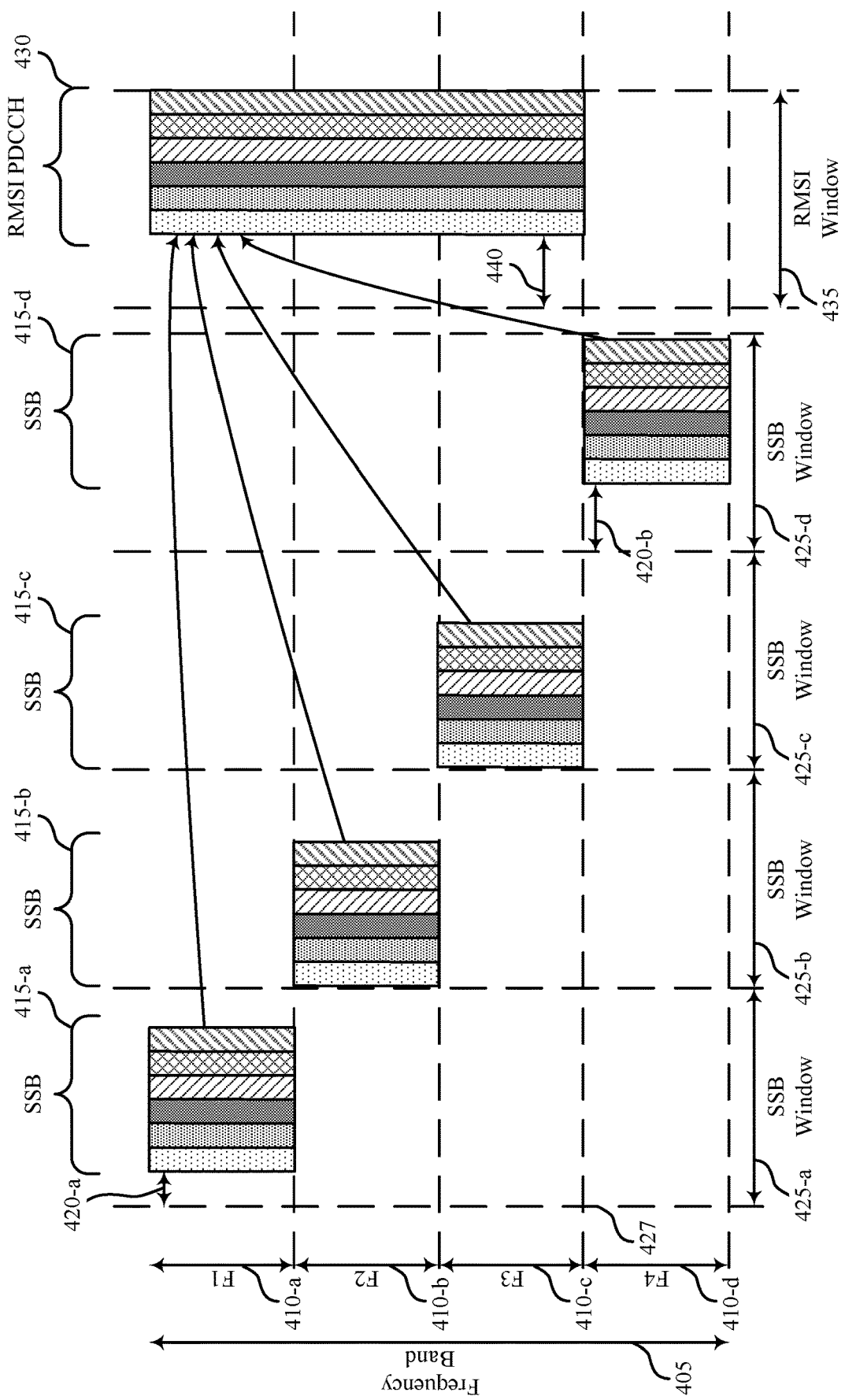
FIG. 4 illustrates another example of an SSB and RMSI resource configuration that supports staggered SSBs in frequency sub-bands for beamformed wireless communications in accordance with aspects of the present disclosure.

FIG. 4 illustrates an example of an SSB and RMSI resource configuration 400 that supports staggered SSBs in frequency sub-bands for beamformed wireless communications in accordance with aspects of the present disclosure. In some examples, SSB and RMSI resource configuration 400 may implement aspects of wireless communications system 100 or 200. In this example, a base station and UE (which may be examples of base stations 105 or UEs 115 of FIG. 1 or 2) may perform beamformed transmissions in a frequency band 405. In some cases, the frequency band 405 may be a high-band mmW frequency band. In this example, similarly as in the example of FIG. 3, a number of frequency sub-bands may be configured, including a first sub-band 410-a (F1), a second sub-band 410-b (F2), a third sub-band 410-c (F3), and a fourth sub-band 410-d (F4). While four frequency sub-bands 410 are illustrated in FIG. 4, other numbers of frequency sub-bands may be used, with the example of four sub-bands provided for purposes of illustration and discussion only.

In this example, similarly as with the example of FIG. 3, the base station may transmit a first instance of beamformed SSBs 415-a via an SSB beam sweeping procedure using the first frequency sub-band 410-a, and the beamformed SSBs 415-a may provide an indication of resources for RMSI beam sweeping procedure in an RMSI window 435 used to transmit beamformed RMSI control channel transmissions 430. The RMSI beam sweeping procedure of the beamformed RMSI control channel transmissions 430 may be transmitted via the same set of transmission beams as used for SSB beam sweeping procedure, but may be transmitted using frequencies that span multiple of the frequency sub-bands 410.

In this example, again, the staggered SSBs 415 may be cycled through each of the multiple predefined frequency sub-bands 410. In such a manner, as one SSB 415 is transmitted at a time in one associated frequency sub-band 410, the PSD of the SSB 415 transmissions may be maximized for each frequency sub-band 410, and transmissions of SSBs 415 are not limited to one sub-band 410. In this example, the base station may perform LBT prior to transmitting the SSBs 415, and in each frequency sub-band 410 an SSB window 425 may define a time period during which the associated SSBs 415 may be transmitted by the base station. In such cases, the SSBs 415 may be transmitted within an SSB window 425, where the start of the SSBs 415 occurs after a successful LBT is completed within the SSB window 425. In this example, a first instance of the SSBs 415-a may start following gap 420-a in a first SSB window 425-a, a second instance of the SSBs 415-b and a third instance of the SSBs 415-c may each start at the beginning of their corresponding SSB windows 425-b and 425-c, and a fourth instance of the SSBs 415-d may be transmitted following gap 420-b in a fourth SSB window 425-d. In some cases, the SSBs 415 may indicate resources for the beamformed RMSI control channel transmissions 430. In some cases, as will be discussed in more detail with respect to FIG. 5, the time location of the RMSI control channel transmissions may be indicated relative to a fixed SSB time boundary or SSB starting point 427 or based on a relative location of the SSBs 415 within the respective SSB window 425.

In some cases, SSBs 415 that are transmitted in each of the frequency sub-bands 410 may each include a PBCH payload that is associated with a time offset of the frequency sub-band 410 used to transmit the SSB 415. For example, the SSB PBCH may indicate T0 for the first frequency sub-band 410-a, may indicate T1 for the second frequency sub-band 410-b, may indicate T2 for the third frequency sub-band 410-c, and so on. Each of the different T0, T1, and T2 values may indicate a timing of the RMSI window 435 relative to the reference timing of the SSB starting point 427. Such techniques may allow the base station to change the order in which the frequency sub-bands 410 are cycled in an SSB beam sweeping procedure. In some cases, each PBCH payload may indicate a value of floor(T/N), where T is a time of the associated SSB window 425 and mod N is the repetition periodicity of the underlying SSB pattern, such that the SSB starting point 427 may be identified.

Additionally or alternatively, the beamformed RMSI control channel transmissions 430 may be transmitted based on passing an LBT procedure, and an instance of the RMSI control channel transmissions 430 may be dropped if LBT fails. In some cases, such as illustrated in FIG. 4, an RMSI window 435 may be provided and the beamformed RMSI control channel transmissions 430 may be transmitted within the RMSI window 435 upon successful LBT completion (e.g., the successful completion of a Cat4 LBT procedure). In the example of FIG. 4., the beamformed RMSI control channel transmissions 430 may start after time gap 440, within the RMSI window 435 once LBT clears. In such cases, a UE may search for the RMSI control channel transmissions 430 within the RMSI window 435, and may discontinue searching for the RMSI control channel transmissions 430 upon detection of RMSI or the expiration of the RMSI window 435.

As indicated in the example of FIG. 4, the beamformed RMSI control channel transmissions 430 may use different frequency sub-bands 410 than the SSBs 415. In some cases, the frequency location of the RMSI control channel transmissions 430 may be indicated by the SSBs 415. In some examples, a payload transmitted in the SSBs 415 (e.g., in a PBCH of the SSB) may provide an explicit frequency offset for the RMSI control channel transmissions 430. In other cases, the SSBs 415 may provide an implicit indication of the frequency offset for the RMSI control channel transmissions 430 (e.g., based on a partitioned PSS/SSS sequence. The information from the beamformed SSBs 415 and the beamformed RMSI control channel transmissions 430, in some cases, may be used by a UE to determine resources and timing for transmission of a random access request to the base station to initiate system access.

In some cases, a start of the RMSI window 435 may either be fixed or variable relative to SSB windows 425. In cases where the RMSI window 435 is fixed relative to the SSB windows 425, the floating duration of the RMSI window 435 may be limited by the location of the SSBs 415 within the SSB windows 425, in order to keep latency from increasing. In cases where the RMSI window 435 is variable, the timing of the RMSI control channel transmissions 430 may be indicated using the floating location of the SSBs 415. In some cases, as will be discussed in more detail with respect to FIG. 5, a quantized number of available SSB starting locations may be defined within the SSB windows 425 and a location of the RMSI window 435 may be identified based on which of the SSB starting locations is used (e.g., explicitly indicated or implicitly indicated such as by using PSS/SSS sequence partitions) within each of the SSB windows 425. In other cases, the location of the RMSI window 435 may be identified relative to the SSB starting point 427 (i.e., based on a reference timing or frame boundary). Additionally, in some cases, the base station may begin SSB transmissions with a first SSB on a first transmission beam (i.e., SSB0 on transmission beam 0). In other cases, the base station may begin SSB transmissions after LBT clearance starting with SSB-K on transmission beam K, where K is the SSB index as part of a pre-defined pattern relative to an SSB window 425 boundary or frame boundary, or SSB starting point 427. Examples of RMSI timing and SSB starting transmissions are discussed in more detail with respect to FIG. 5.

Figure 5:
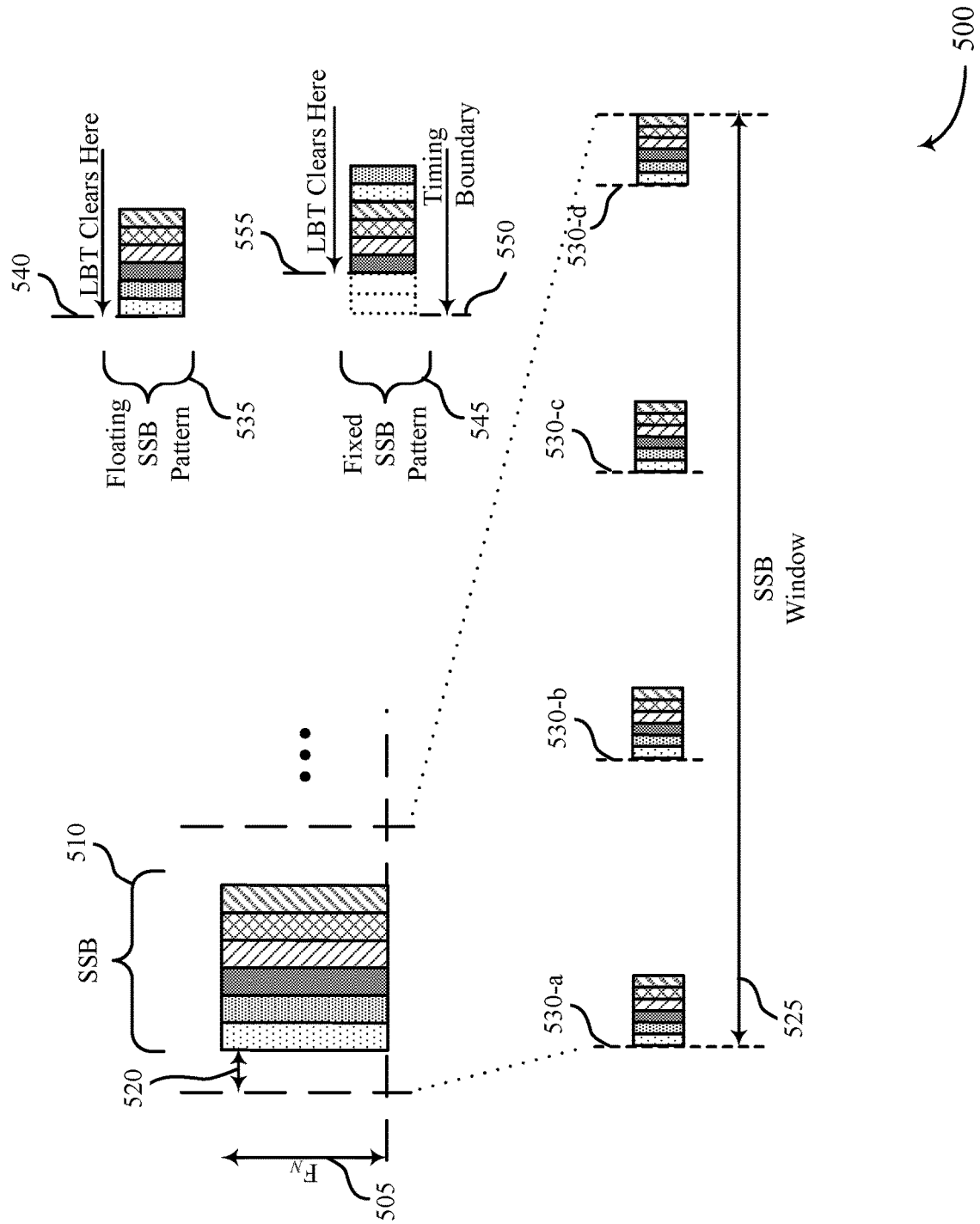
FIG. 5 illustrates examples of floating resource configurations that support staggered SSBs in frequency sub-bands for beamformed wireless communications in accordance with aspects of the present disclosure.

FIG. 5 illustrates an example of a floating resource configurations 500 that supports staggered SSBs in frequency sub-bands for beamformed wireless communications in accordance with aspects of the present disclosure. In some examples, floating resource configurations 500 may implement aspects of wireless communications system 100 or 200. In this example, a first sub-band 505 is illustrated that may be used for an SSB beam sweeping procedure to transmit SSBs 510, and additional frequency sub-bands of a staggered SSB beam sweeping procedure may use the same or similar techniques. In this example, SSBs 510 may be transmitted during SSB window 525 following a successful LBT. As indicated above, in some cases a quantized number of available SSB starting locations 530 may be defined within the SSB window 525 and a location of the RMSI window may be identified based on which of the SSB starting locations 530 within the SSB window 525 is used. In some cases, the location within the SSB window 525 may be explicitly indicated (e.g., in a PBCH payload) or implicitly indicated (e.g., using PSS/SSS sequence partitions). In other cases, the location of the RMSI window may be identified relative to the SSB window 525 boundary (i.e., based on a reference timing, frame boundary, or SSB starting time).

In some cases, the base station may use a floating SSB pattern 535 or a fixed SSB pattern 545 to determine which SSB to begin transmitting following successful LBT. In the floating SSB pattern 535, LBT may clear at time 540 and the base station may begin SSB transmissions with a first SSB on a first transmission beam (i.e., SSB0 on transmission beam 0) irrespective of a time within the SSB window 525 when the LBT clears. In the fixed SSB pattern 545, the base station may begin SSB transmissions after LBT clearance at time 555 starting with SSB-K on transmission beam K, where K is the SSB index as part of a pre-defined pattern relative to timing boundary 550, which may be a time associated with a start of the associated SSB window 525 or an SSB starting time associated with the SSB beam sweeping procedure. In some cases, SSB timing may use additional bits to indicate a value of floor(T/N) where T is time associated with the particular SSB window and mod N is the repetition periodicity of underlying SSB pattern.

Figure 6:
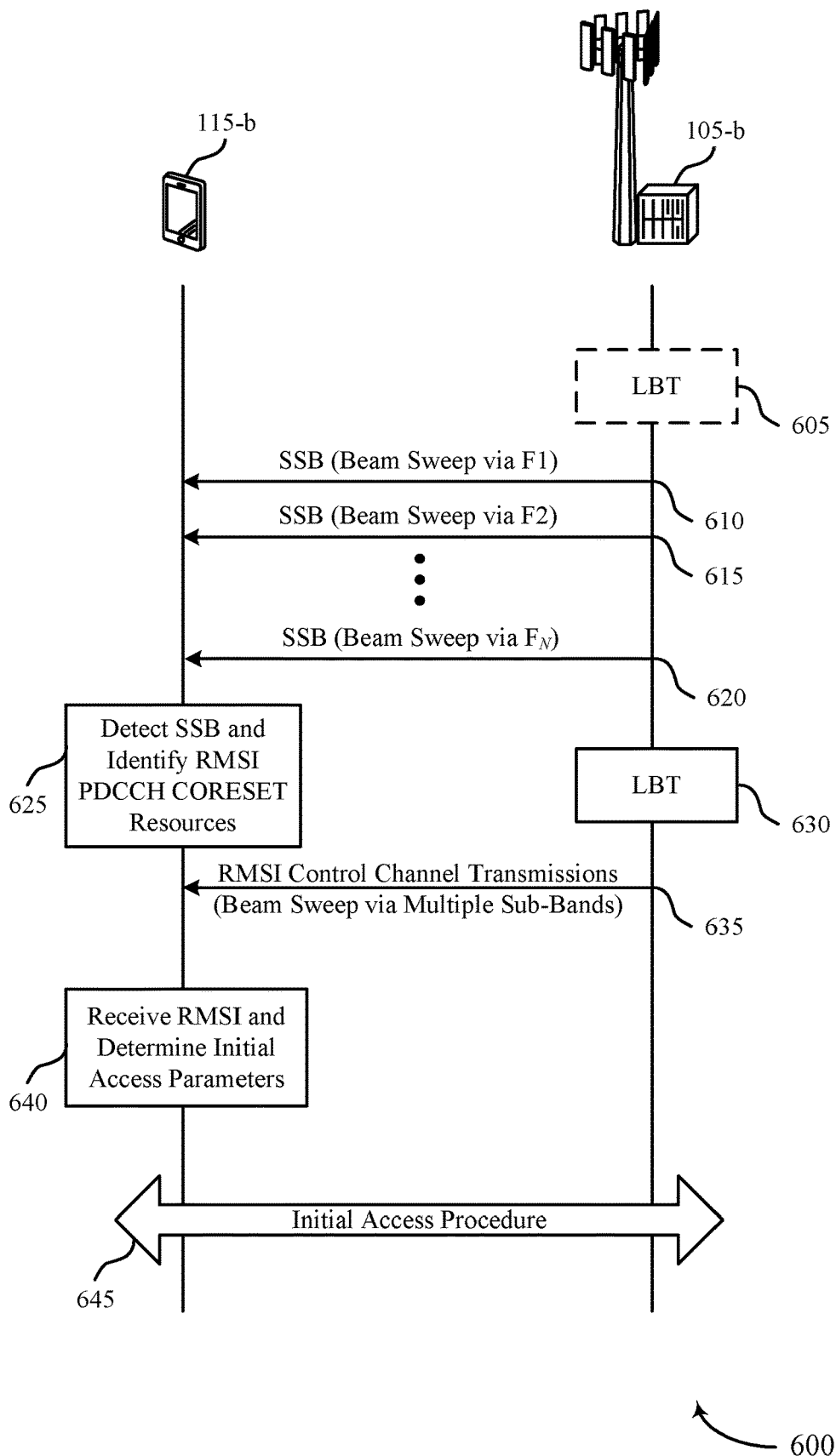
FIG. 6 illustrates an example of a process flow that supports staggered SSBs in frequency sub-bands for beamformed wireless communications in accordance with aspects of the present disclosure.

FIG. 6 illustrates an example of a process flow 600 that supports staggered SSBs in frequency sub-bands for beamformed wireless communications in accordance with aspects of the present disclosure. In some examples, process flow 600 may implement aspects of wireless communications system 100 or 200. In this example, process flow 600 includes UE 115-b and base station 105-b, which may be examples of the corresponding devices described with reference to FIGS. 1 and 2.

At 605, the base station 105-b may optionally perform an LBT procedure. In some cases, the LBT procedure may be performed before transmitting SSBs in an SSB beam sweep procedure. In some cases, the LBT procedure may provide that the base station 105-b identifies a contention window (e.g., based on a type of LBT such as a Cat2 or Cat4 LBT that provide shorter or longer contention windows), and following the expiration of the contention window an energy measurement may be performed on the frequency bands that are to be used for the SSB transmissions. If the energy measurement is below a threshold value, it may indicate that no other transmitters are using the channel and the LBT clears and the base station 105-b may begin transmitting. If the energy measurement is at or above the threshold value, it may indicate that another transmitter is using the channel and the base station 105-b may adjust the contention window and attempt the LBT again following expiration of the contention window, or drop transmissions on a particular band that fails LBT. In cases where the contention window is after the expiration of an SSB window, the base station 105-b may drop the SSB transmission, and a subsequent SSB beam sweeping procedure may be initiated based on an SSB beam sweeping periodicity.

At 610, the base station 105-b may transmit SSBs via an SSB beam sweeping procedure on a first frequency sub-band. In cases where the LBT procedure is used, the SSBs may be transmitted responsive to a successful LBT procedure. In some cases, a number of SSBs may be transmitted using a number of transmission beams in the SSB beam sweep procedure. In this example, multiple other SSBs may be transmitted at 615 through 620 on other frequency sub-bands at staggered times such that only one frequency sub-band at a time has an SSB transmission.

At 625, the UE 115-*b* may detect one or more of the SSBs from the base station 105-*b* and identify RMSI resources (e.g., a CORESET for transmission of RMSI PDCCH). In some cases, the UE 115-*b* may run a searcher to monitor for SSB transmissions via one or more of the frequency sub-bands. In some cases, the UE 115-*b* may monitor for SSBs on multiple sub-bands and combine multiple instances of SSBs. In some cases, the RMSI resources may be identified based on one or more of an implicit indication or an explicit indication, or both, provided with the detected SSB. In some cases, the SSB may indicate time resources for the RMSI, frequency resources for the RMSI, or both.

At 630, the base station 105-*b* may perform another LBT to determine if the frequency sub-bands associated with the RMSI control channel transmissions (e.g., RMSI PDCCH transmissions) are clear for an RMSI beam sweeping procedure. At 635, if the LBT procedure clears, the base station 105-*b* transmits the RMSI control channel transmissions using the RMSI beam sweeping procedure. In some cases, the RMSI control channel transmissions start after a successful LBT procedure within an RMSI window. In some cases, if the LBT fails, the base station 105-*b* may drop the RMSI control channel transmissions. In cases where the base station 105-*b* transmits the RMSI control channel transmissions, such transmissions may span two or more frequency sub-bands.

At 640, the UE 115-*b* may receive one or more of the RMSI control channel transmissions and determine one or more initial access parameters for the base station 105-*b*. In some cases, the RMSI control channel transmissions may indicate a location for RMSI PDSCH transmissions that include system information that, in conjunction with the SSB and RMSI CORESET, provide parameters for initiating initial access. The one or more initial access parameters may include, for example, RACH timing and resources for a random access request to be transmitted to the base station 105-*b*. In some cases, the initial access parameters may include one or more beamforming parameters associated with random access resources for initial access. At 645, the UE 115-*b* and the base station 105-*b* may perform the initial access procedure to establish a connection between the UE 115-*b* and the base station 105-*b*.

Figure 7:
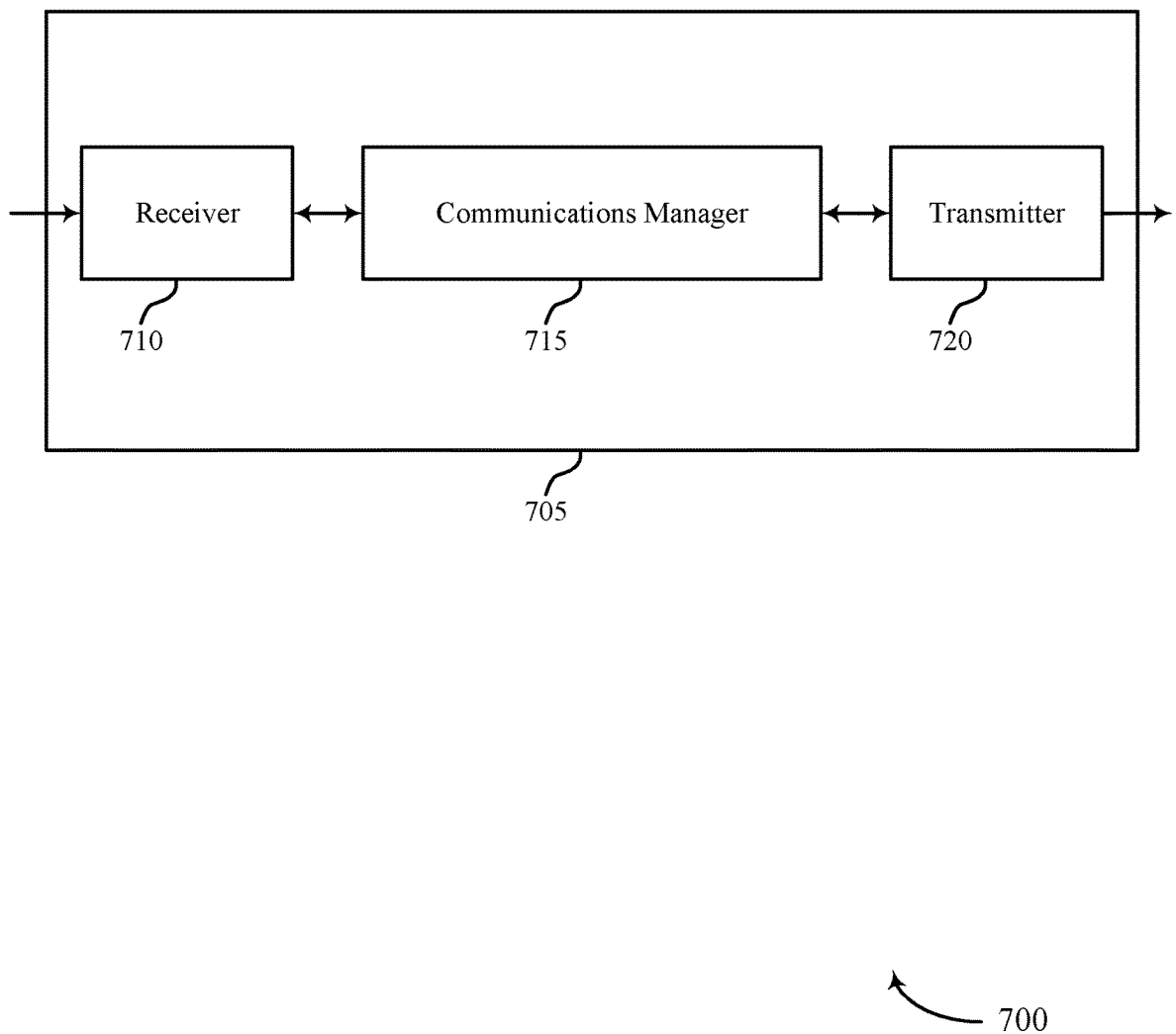
FIGS. 7 and 8 show block diagrams of devices that support staggered SSBs in frequency sub-bands for beamformed wireless communications in accordance with aspects of the present disclosure.

FIG. 7 shows a block diagram 700 of a device 705 that supports staggered SSBs in frequency sub-bands for beamformed wireless communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to staggered SSBs in frequency sub-bands for beamformed wireless communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may monitor one or more of a set of frequency sub-bands for an SSB from a base station, where each of the set of frequency sub-bands carries a non-overlapping instance of the SSB, receive a first instance of the SSB via at least a first frequency sub-band of the set of frequency sub-bands based on the monitoring, determine a reference timing of the base station based on one or more of information from the first instance of the SSB or a frequency location of the first frequency sub-band relative to a reference frequency sub-band of the set of frequency sub-bands, identify, based on the reference timing, a set of resources (e.g., a CORESET) for a control channel transmission from the base station, where the set of resources spans two or more of the set of frequency sub-bands, and receive the control channel transmission (e.g., an RMSI PDCCH transmission) via the set of resources. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
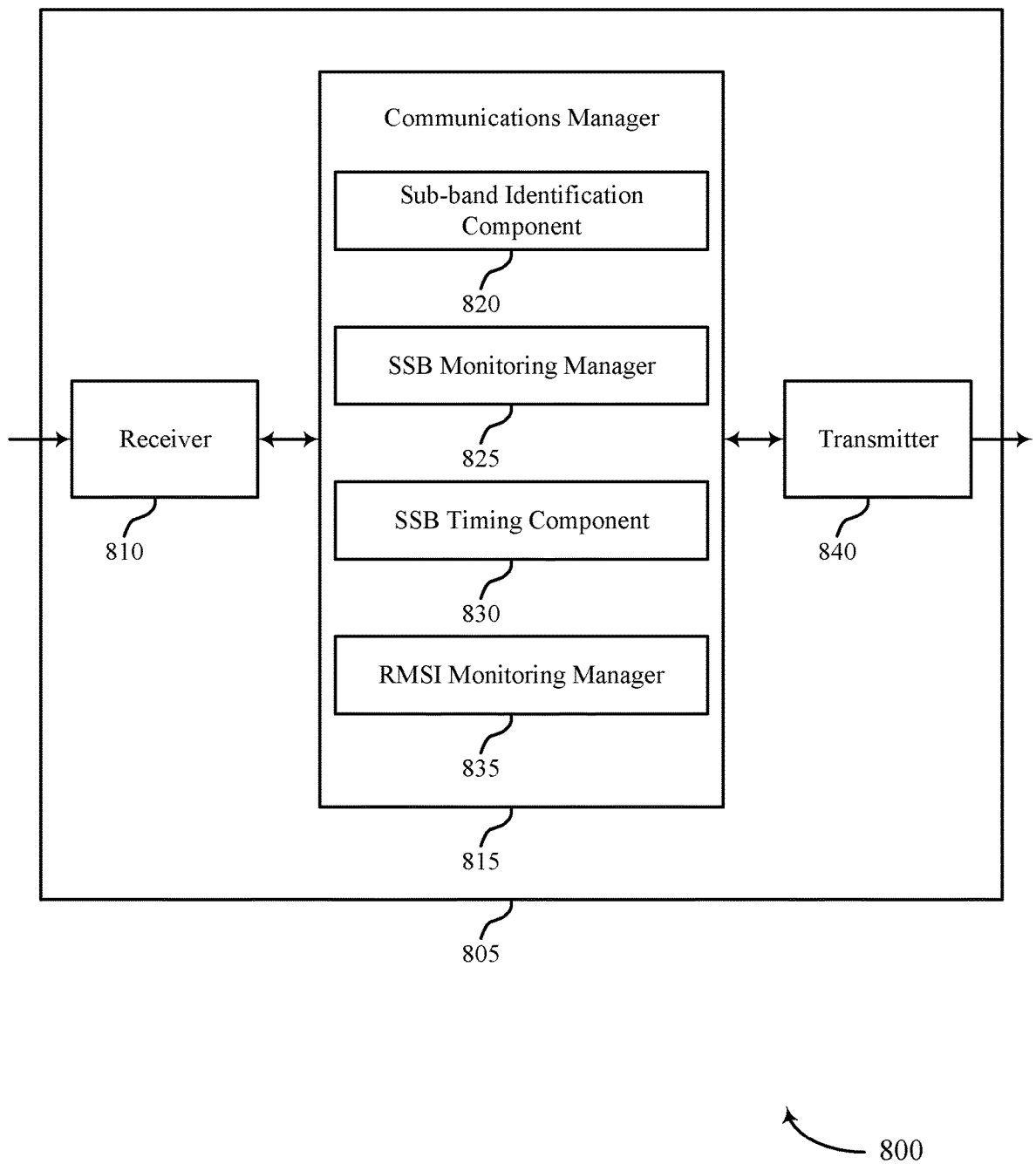

FIG. 8 shows a block diagram 800 of a device 805 that supports staggered SSBs in frequency sub-bands for beamformed wireless communications in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to staggered SSBs in frequency sub-bands for beamformed wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a sub-band identification component 820, an SSB monitoring manager 825, an SSB timing component 830, and an RMSI monitoring manager 835. The communications manager 815 may be an example of aspects of the communications manager 1010 described herein.

The sub-band identification component 820 may monitor one or more of a set of frequency sub-bands for an SSB from a base station, where each of the set of frequency sub-bands carries a non-overlapping instance of the SSB.

The SSB monitoring manager 825 may receive a first instance of the SSB via at least a first frequency sub-band of the set of frequency sub-bands based on the monitoring.

The SSB timing component 830 may determine a reference timing of the base station based on one or more of information from the first instance of the SSB or a frequency location of the first frequency sub-band relative to a reference frequency sub-band of the set of frequency sub-bands.

The RMSI monitoring manager 835 may identify, based on the reference timing, a set of resources for a control channel transmission from the base station, where the set of resources spans two or more of the set of frequency sub-bands and receive the control channel transmission via the set of resources.

In some implementations, the actions performed by the sub-band identification component 820, the SSB monitoring manager 825, the SSB timing component 830, and the RMSI monitoring manager 835, as described herein, may facilitate the processor 1040, as described with reference to FIG. 10, to more efficiently cause the device 805 to perform various functions. For example, transmission of the SSBs in a first beam sweeping procedure using a single frequency sub-band may facilitate relatively increased PSD of the SSB transmissions, which may accordingly relatively improve the likelihood that the device 805 successfully detects the SSB. Control channel transmissions (e.g., RMSI PDCCH transmissions) in a second beam sweeping procedure may span additional frequency sub-bands and thus carry additional information relative to the SSB transmissions.

As such, the device 805 may identify beamforming characteristics for the second beam sweeping procedure based on the SSB, and thus transmission beams of the second beam sweeping procedure may have reduced PSD relative to the first beam sweeping procedure while providing sufficient reliability for detection by the device 805. In using these beamformed communications techniques, the device 805 may communicate with the base station with relatively greater efficiency and reliability, which may correspondingly reduce repeated transmissions and conserve frequency, time, and/or spatial resources. Accordingly, the device 805 may reduce a number of processing operations at the processor and other components of the device 805, which may in turn provide power savings and conserve processing resources for the processor of the device 805.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
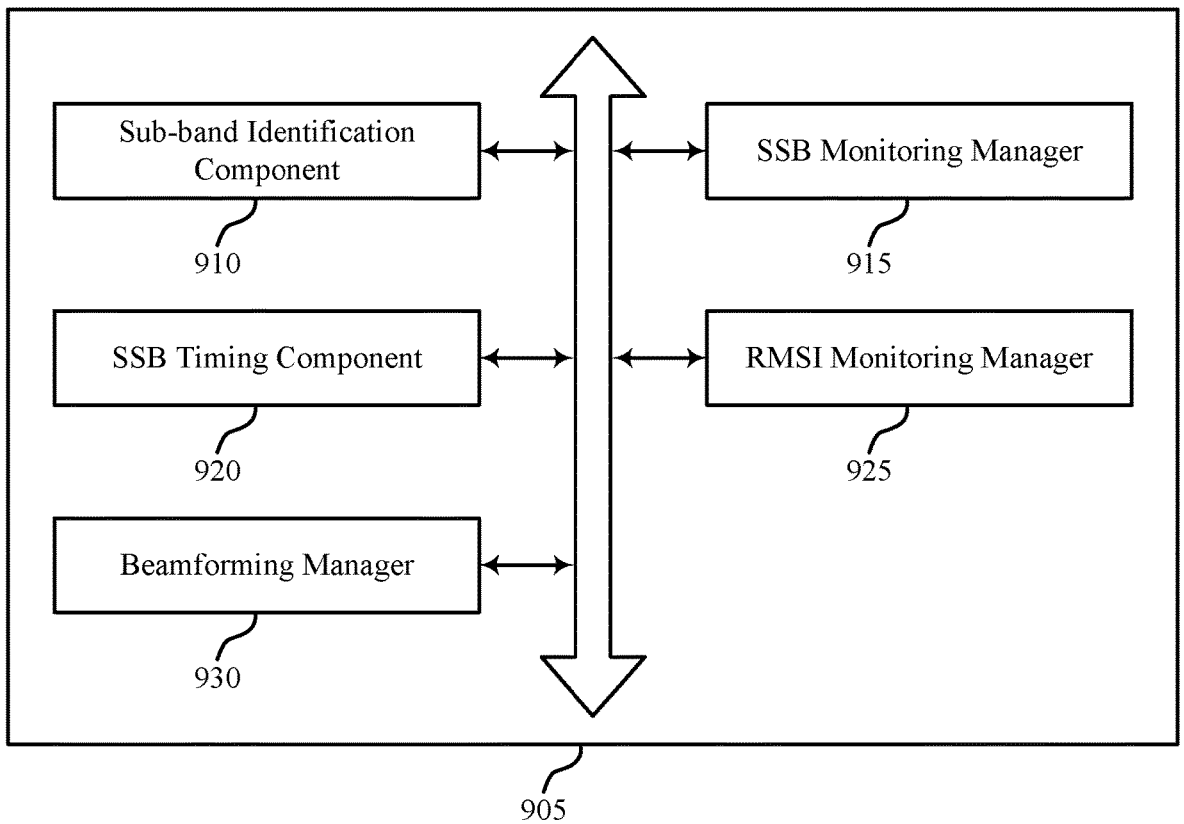
FIG. 9 shows a block diagram of a communications manager that supports staggered SSBs in frequency sub-bands for beamformed wireless communications in accordance with aspects of the present disclosure.

FIG. 9 shows a block diagram 900 of a communications manager 905 that supports staggered SSBs in frequency sub-bands for beamformed wireless communications in accordance with aspects of the present disclosure. The communications manager 905 may be an example of aspects of a communications manager 715, a communications manager 815, or a communications manager 1010 described herein. The communications manager 905 may include a sub-band identification component 910, an SSB monitoring manager 915, an SSB timing component 920, an RMSI monitoring manager 925, and a beamforming manager 930. Each of these modules may communicate, directly or indirectly, with one another (e.g., via one or more buses).

The sub-band identification component 910 may monitor one or more of a set of frequency sub-bands for an SSB from a base station, where each of the set of frequency sub-bands carries a non-overlapping instance of the SSB. In some cases, each frequency sub-band of the set of frequency sub-bands has a corresponding offset from the reference timing of the base station.

The SSB monitoring manager 915 may receive a first instance of the SSB via at least a first frequency sub-band of the set of frequency sub-bands based on the monitoring. In some examples, the SSB monitoring manager 915 may monitor two or more of the set of frequency sub-bands for respective instances of the SSB. In some examples, the SSB monitoring manager 915 may combine two or more instances of the SSB from the monitored two or more of the set of frequency sub-bands.

In some cases, each of the instances of the SSB transmitted via each of the set of frequency sub-bands indicates a same set of resources for the control channel transmission from the base station. In some cases, an SSB payload of each instance of the SSB indicates the reference timing of the base station relative to the respective instance of the SSB.

The SSB timing component 920 may determine a reference timing of the base station based on one or more of information from the first instance of the SSB or a frequency location of the first frequency sub-band relative to a reference frequency sub-band of the set of frequency sub-bands. In some examples, the SSB timing component 920 may identify a fixed time periodicity for monitoring the one or more of the set of frequency sub-bands for the SSB from the base station. In some examples, the SSB timing component 920 may identify an SSB time window for monitoring the one or more of the set of frequency sub-bands for the SSB from the base station.

The RMSI monitoring manager 925 may identify, based on the reference timing, a set of resources for a control channel transmission from the base station, where the set of resources spans two or more of the set of frequency sub-bands. In some examples, the RMSI monitoring manager 925 may receive the control channel transmission via the set of resources. In some examples, the RMSI monitoring manager 925 may determine a frequency offset of the set of resources relative to the first frequency sub-band based on information provided by the first instance of the SSB.

In some cases, the set of resources includes a predetermined starting time resource for the control channel transmission relative to the reference frequency sub-band of the set of frequency sub-bands. In some cases, the set of resources includes a control channel time window during which the UE is to monitor for the control channel transmission. In some cases, a duration of the control channel time window is based on an LBT procedure duration and a number of LBT attempts that the base station is configured to perform before dropping the control channel transmission.

The beamforming manager 930 may identify one or more transmission beams that are used to receive the SSB and system information. In some cases, the SSB is transmitted using an SSB beam sweeping procedure in which a series of consecutive transmission beams within each frequency sub-band each carry a corresponding SSB, and where a same initial transmission beam of the series of consecutive transmission beams is used irrespective of when the SSB beam sweeping procedure starts within the SSB time window. In some cases, the SSB is transmitted using an SSB beam sweeping procedure in which a series of consecutive transmission beams each carry a corresponding SSB having an SSB index that indicates a position of the SSB relative to a frame boundary within each frequency sub-band of the set of frequency sub-bands.

Figure 10:
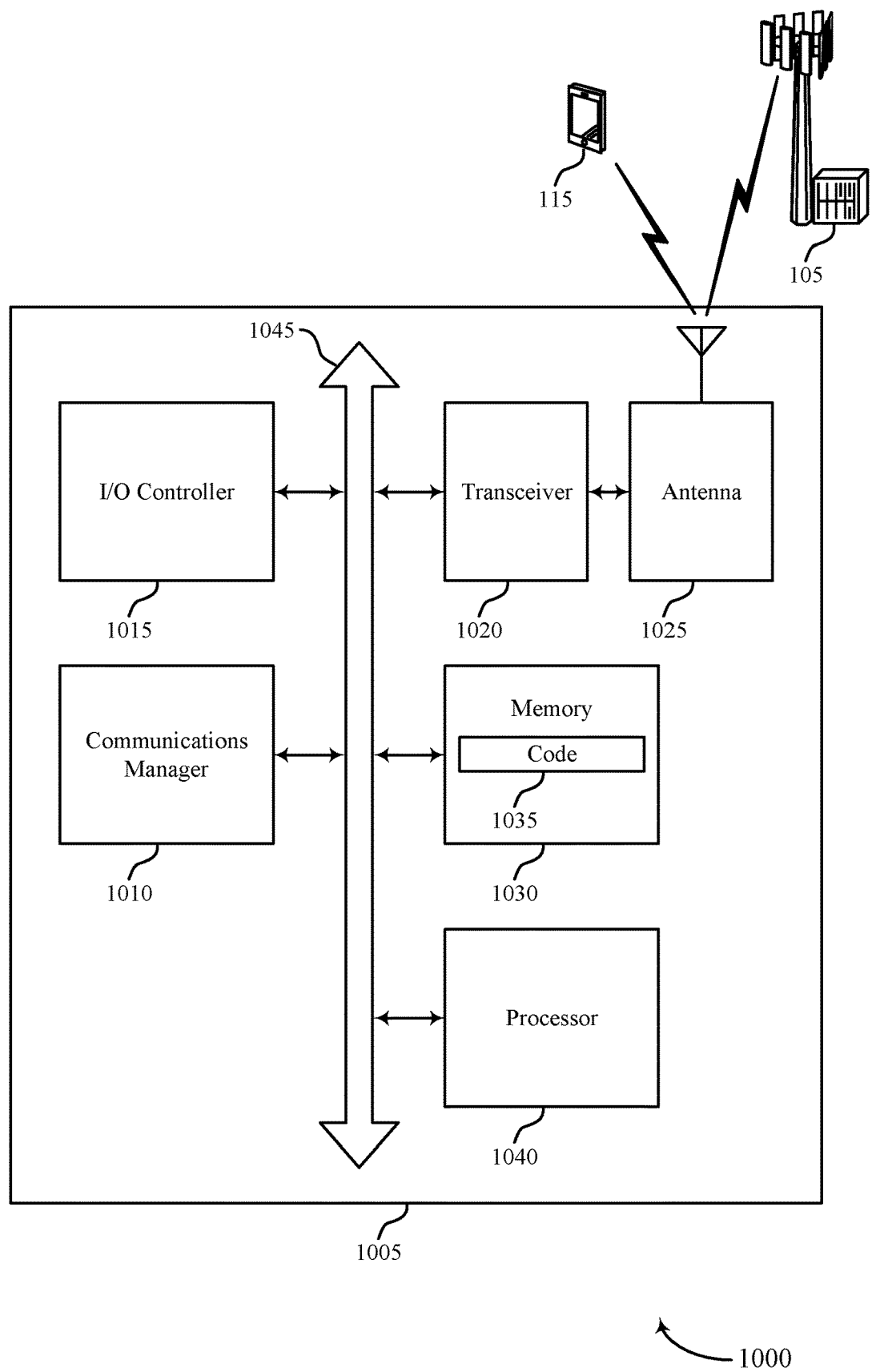
FIG. 10 shows a diagram of a system including a device that supports staggered SSBs in frequency sub-bands for beamformed wireless communications in accordance with aspects of the present disclosure.

FIG. 10 shows a diagram of a system 1000 including a device 1005 that supports staggered SSBs in frequency sub-bands for beamformed wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may monitor one or more of a set of frequency sub-bands for an SSB from a base station, where each of the set of frequency sub-bands carries a non-overlapping instance of the SSB, receive a first instance of the SSB via at least a first frequency sub-band of the set of frequency sub-bands based on the monitoring, determine a reference timing of the base station based on one or more of information from the first instance of the SSB or a frequency location of the first frequency sub-band relative to a reference frequency sub-band of the set of frequency sub-bands, identify, based on the reference timing, a set of resources for a control channel transmission from the base station, where the set of resources spans two or more of the set of frequency sub-bands, and receive the control channel transmission via the set of resources.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting staggered SSBs in frequency sub-bands for beamformed wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
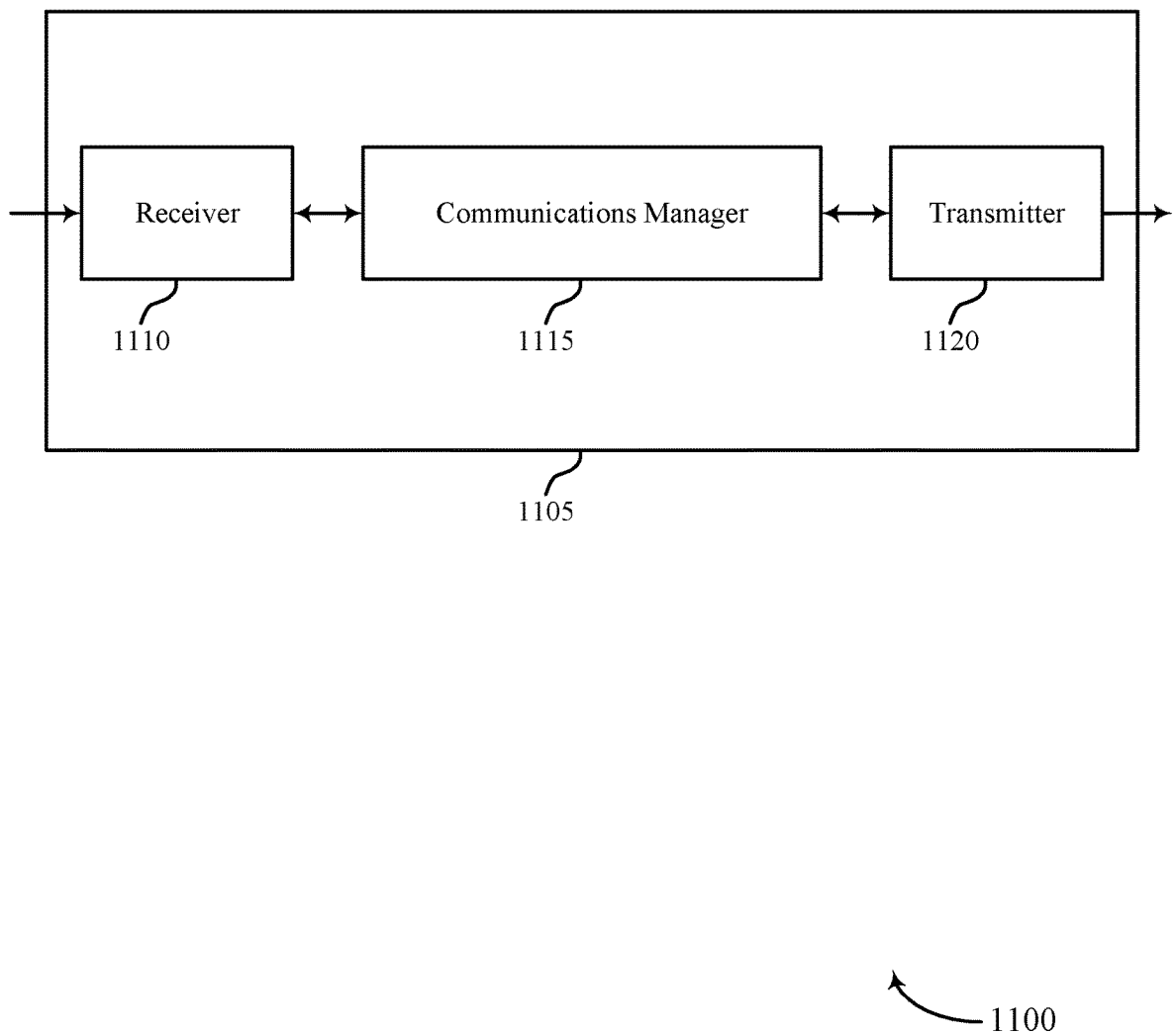
FIGS. 11 and 12 show block diagrams of devices that support staggered SSBs in frequency sub-bands for beamformed wireless communications in accordance with aspects of the present disclosure.

FIG. 11 shows a block diagram 1100 of a device 1105 that supports staggered SSBs in frequency sub-bands for beamformed wireless communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to staggered SSBs in frequency sub-bands for beamformed wireless communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a set of frequency sub-bands for transmitting a set of SSBs via a set of transmission beams in an SSB beam sweeping procedure, identify a set of resources for transmitting a set of RMSI control channel transmissions via the set of transmission beams in an RMSI beam sweeping procedure, where the set of resources spans two or more of the set of frequency sub-bands, transmit, responsive to completing the LBT procedure, the set of RMSI control channel transmissions via the set of transmission beams in the RMSI beam sweeping procedure, transmit the set of SSBs via the set of transmission beams in the SSB beam sweeping procedure in each of the set of sub-bands, where the SSB beam sweeping procedure is performed separately during non-overlapping time periods for each frequency sub-band of the set of frequency sub-bands, and where each of the set of SSBs indicates a reference timing of the base station that is used to identify the set of resources, and perform an LBT procedure for initiating the set of RMSI control channel transmissions. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
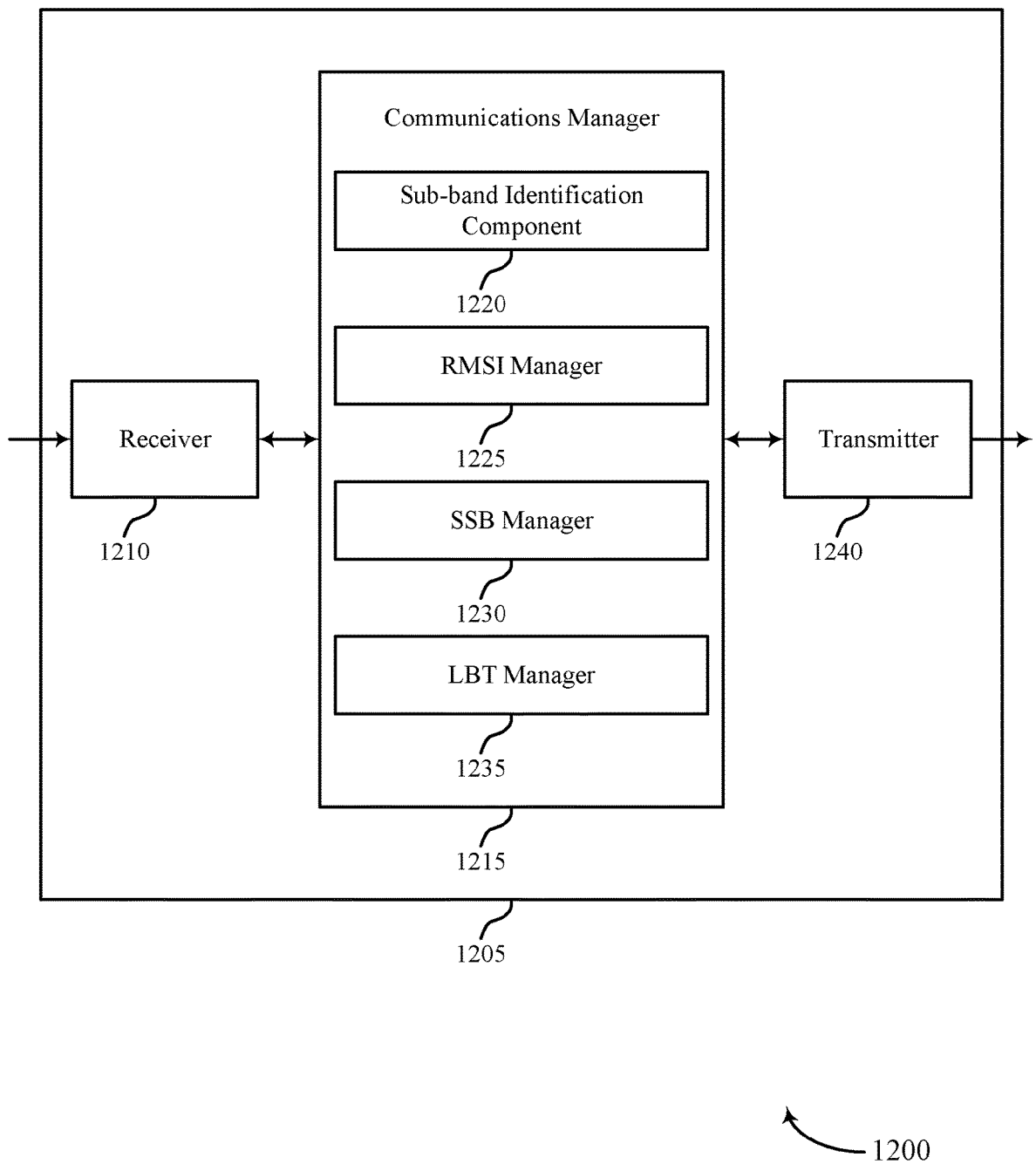

FIG. 12 shows a block diagram 1200 of a device 1205 that supports staggered SSBs in frequency sub-bands for beamformed wireless communications in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to staggered SSBs in frequency sub-bands for beamformed wireless communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a sub-band identification component 1220, an RMSI manager 1225, an SSB manager 1230, and an LBT manager 1235. The communications manager 1215 may be an example of aspects of the communications manager 1410 described herein.

The sub-band identification component 1220 may identify a set of frequency sub-bands for transmitting a set of SSBs via a set of transmission beams in an SSB beam sweeping procedure.

The RMSI manager 1225 may identify a set of resources for transmitting a set of RMSI control channel transmissions via the set of transmission beams in an RMSI beam sweeping procedure, where the set of resources spans two or more of the set of frequency sub-bands and transmit, responsive to completing the LBT procedure, the set of RMSI control channel transmissions via the set of transmission beams in the RMSI beam sweeping procedure using the set of resources.

The SSB manager 1230 may transmit the set of SSBs via the set of transmission beams in the SSB beam sweeping procedure in each of the set of sub-bands, where the SSB beam sweeping procedure is performed separately during non-overlapping time periods for each frequency sub-band of the set of frequency sub-bands, and where each of the set of SSBs indicates a reference timing of the base station that is used to identify the set of resources.

The LBT manager 1235 may perform an LBT procedure for initiating the set of RMSI control channel transmissions.

In some implementations, the actions performed by the sub-band identification component 1220, the RMSI manager 1225, the SSB manager 1230, and the LBT manager 1235, as described herein, may facilitate the processor 1440, as described with reference to FIG. 14, to more efficiently cause the device 1205 to perform various functions. For example, the device 1205 may transmit SSBs to a receiving device (e.g., a UE) in a first beam sweeping procedure using a single frequency sub-band (e.g., selected by the device 1205 based on a long term interference metric), which may facilitate relatively increased PSD of the SSB transmissions and accordingly may relatively improve the likelihood that the receiving device successfully detects the SSBs. The device 1205 may transmit control channel transmissions (e.g., RMSI PDCCH transmissions) in a second beam sweeping procedure spanning additional frequency sub-bands and thus carrying additional information relative to the SSB transmissions.

As such, the device 1205 may facilitate the receiving device to identify certain beamforming characteristics for the second beam sweeping procedure based on the SSBs transmitted by the device 1205 in the first beam sweeping procedure, and thus transmission beams of the second beam sweeping procedure may have reduced PSD relative to the first beam sweeping procedure while providing sufficient reliability for detection by the receiving device. In using these beamformed communications techniques, the device 1205 may communicate with the receiving device (e.g., one of several UEs with which the device 1205 may communicate) with relatively greater efficiency and reliability, which may correspondingly reduce repeated transmissions and conserve frequency, time, and/or spatial resources. Accordingly, the device 1205 may reduce a number of processing operations at the processor and other components of the device 1205, which may in turn provide power savings and conserve processing resources for the processor of the device 1205.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
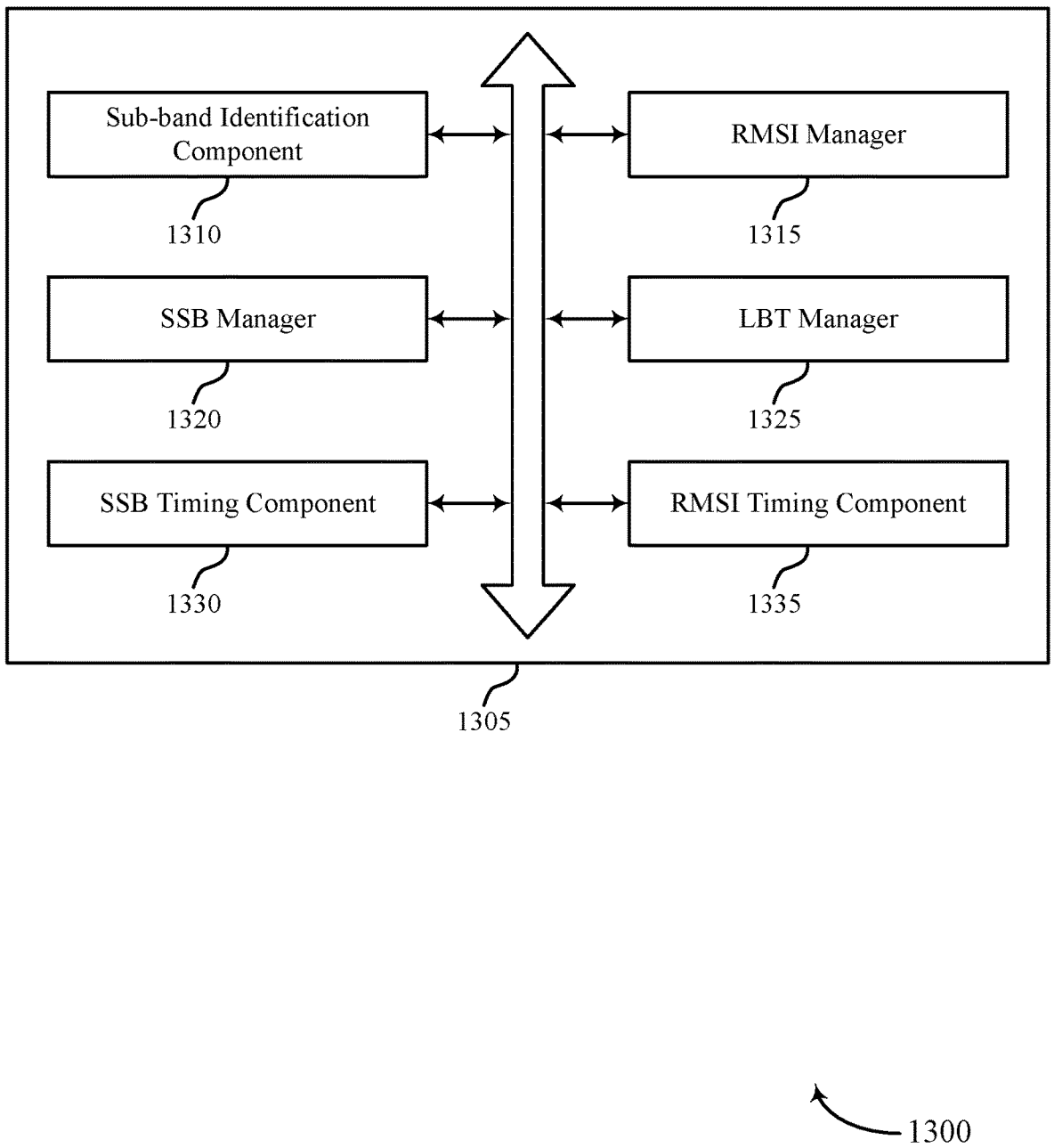
FIG. 13 shows a block diagram of a communications manager that supports staggered SSBs in frequency sub-bands for beamformed wireless communications in accordance with aspects of the present disclosure.

FIG. 13 shows a block diagram 1300 of a communications manager 1305 that supports staggered SSBs in frequency sub-bands for beamformed wireless communications in accordance with aspects of the present disclosure. The communications manager 1305 may be an example of aspects of a communications manager 1115, a communications manager 1215, or a communications manager 1410 described herein. The communications manager 1305 may include a sub-band identification component 1310, an RMSI manager 1315, an SSB manager 1320, an LBT manager 1325, an SSB timing component 1330, and an RMSI timing component 1335. Each of these modules may communicate, directly or indirectly, with one another (e.g., via one or more buses).

The sub-band identification component 1310 may identify a set of frequency sub-bands for transmitting a set of SSBs via a set of transmission beams in an SSB beam sweeping procedure.

The RMSI manager 1315 may identify a set of resources for transmitting a set of RMSI control channel transmissions via the set of transmission beams in an RMSI beam sweeping procedure, where the set of resources spans two or more of the set of frequency sub-bands. In some examples, the RMSI manager 1315 may transmit, responsive to completing the LBT procedure, the set of RMSI control channel transmissions via the set of transmission beams in the RMSI beam sweeping procedure using the set of resources.

The SSB manager 1320 may transmit the set of SSBs via the set of transmission beams in the SSB beam sweeping procedure in each of the set of sub-bands, where the SSB beam sweeping procedure is performed separately during non-overlapping time periods for each frequency sub-band of the set of frequency sub-bands, and where each of the set of SSBs indicates a reference timing of the base station that is used to identify the set of resources. In some examples, the SSB manager 1320 may identify an SSB time window for each of the set of frequency sub-bands for transmitting the set of SSBs. In some cases, each of the SSBs are transmitted according to a fixed time periodicity without performing an LBT procedure.

In some cases, a same initial transmission beam of the SSB beam sweeping procedure is used irrespective of when the SSB beam sweeping procedure starts within the SSB time window. In some cases, each of the set of SSBs has an associated SSB index that indicates a position of the SSB within a predetermined SSB pattern relative to a frame boundary within each frequency sub-band of the set of frequency sub-bands.

In some cases, each of the SSBs transmitted via each of the set of frequency sub-bands indicates a same set of resources for the RMSI control channel transmissions. In some cases, an SSB payload of each of the SSBs indicates the reference timing of the base station relative to the respective SSB. In some cases, each of the set of SSBs provides an indication of a frequency offset of the set of resources relative to a respective frequency sub-band of the set of frequency sub-bands used to transmit the SSB.

The LBT manager 1325 may perform an LBT procedure for initiating the set of RMSI control channel transmissions. In some examples, the LBT manager 1325 may perform an LBT procedure during the SSB time window for each of the set of frequency sub-bands prior to transmitting the set of SSBs, where the set of SSBs are transmitted responsive to successfully completing the LBT procedure.

The SSB timing component 1330 may determine SSB timing information to provide with the SSB transmissions. In some cases, each frequency sub-band of the set of frequency sub-bands has a corresponding time offset from the reference timing of the base station.

The RMSI timing component 1335 may determine RMSI timing information to provide with the SSB transmissions. In some cases, the set of resources includes a predetermined starting time resource for the RMSI control channel transmission relative to a reference sub-band of the set of frequency sub-bands. In some cases, the set of resources is associated with an RMSI time window during which the RMSI beam sweeping procedure is to be performed, and where a starting time of the RMSI beam sweeping procedure within the RMSI time window is dependent upon a time of completion of the LBT procedure for initiating the set of RMSI control channel transmissions. In some cases, a duration of the RMSI time window is based on a duration of the LBT procedure and a number of LBT attempts that the base station is configured to perform before dropping the set of RMSI control channel transmissions.

Figure 14:
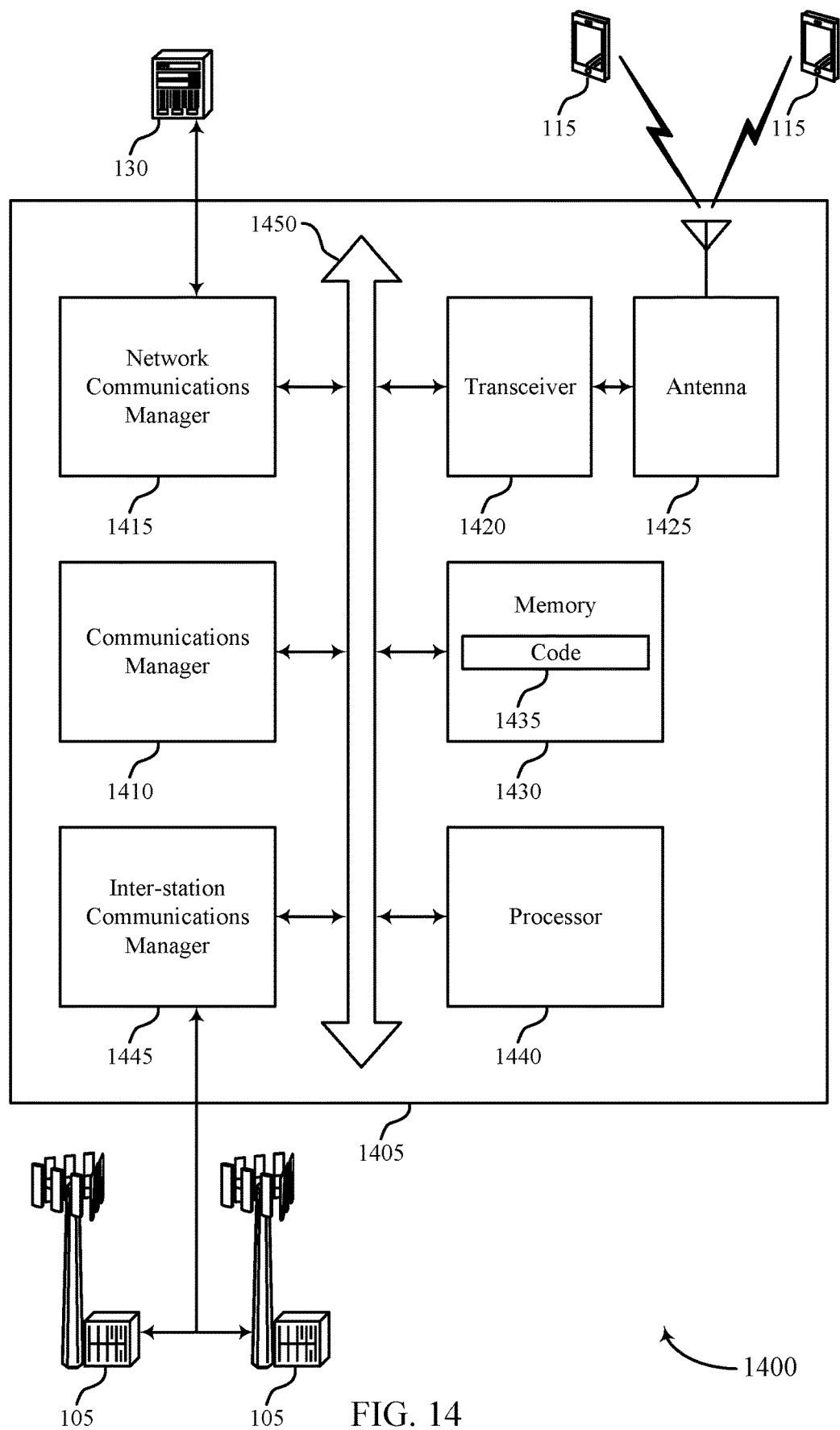
FIG. 14 shows a diagram of a system including a device that supports staggered SSBs in frequency sub-bands for beamformed wireless communications in accordance with aspects of the present disclosure.

FIG. 14 shows a diagram of a system 1400 including a device 1405 that supports staggered SSBs in frequency sub-bands for beamformed wireless communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a set of frequency sub-bands for transmitting a set of SSBs via a set of transmission beams in an SSB beam sweeping procedure, identify a set of resources for transmitting a set of RMSI control channel transmissions via the set of transmission beams in an RMSI beam sweeping procedure, where the set of resources spans two or more of the set of frequency sub-bands, transmit, responsive to completing the LBT procedure, the set of RMSI control channel transmissions via the set of transmission beams in the RMSI beam sweeping procedure using the set of resources, transmit the set of SSBs via the set of transmission beams in the SSB beam sweeping procedure in each of the set of sub-bands, where the SSB beam sweeping procedure is performed separately during non-overlapping time periods for each frequency sub-band of the set of frequency sub-bands, and where each of the set of SSBs indicates a reference timing of the base station that is used to identify the set of resources, and perform an LBT procedure for initiating the set of RMSI control channel transmissions.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting staggered SSBs in frequency sub-bands for beamformed wireless communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
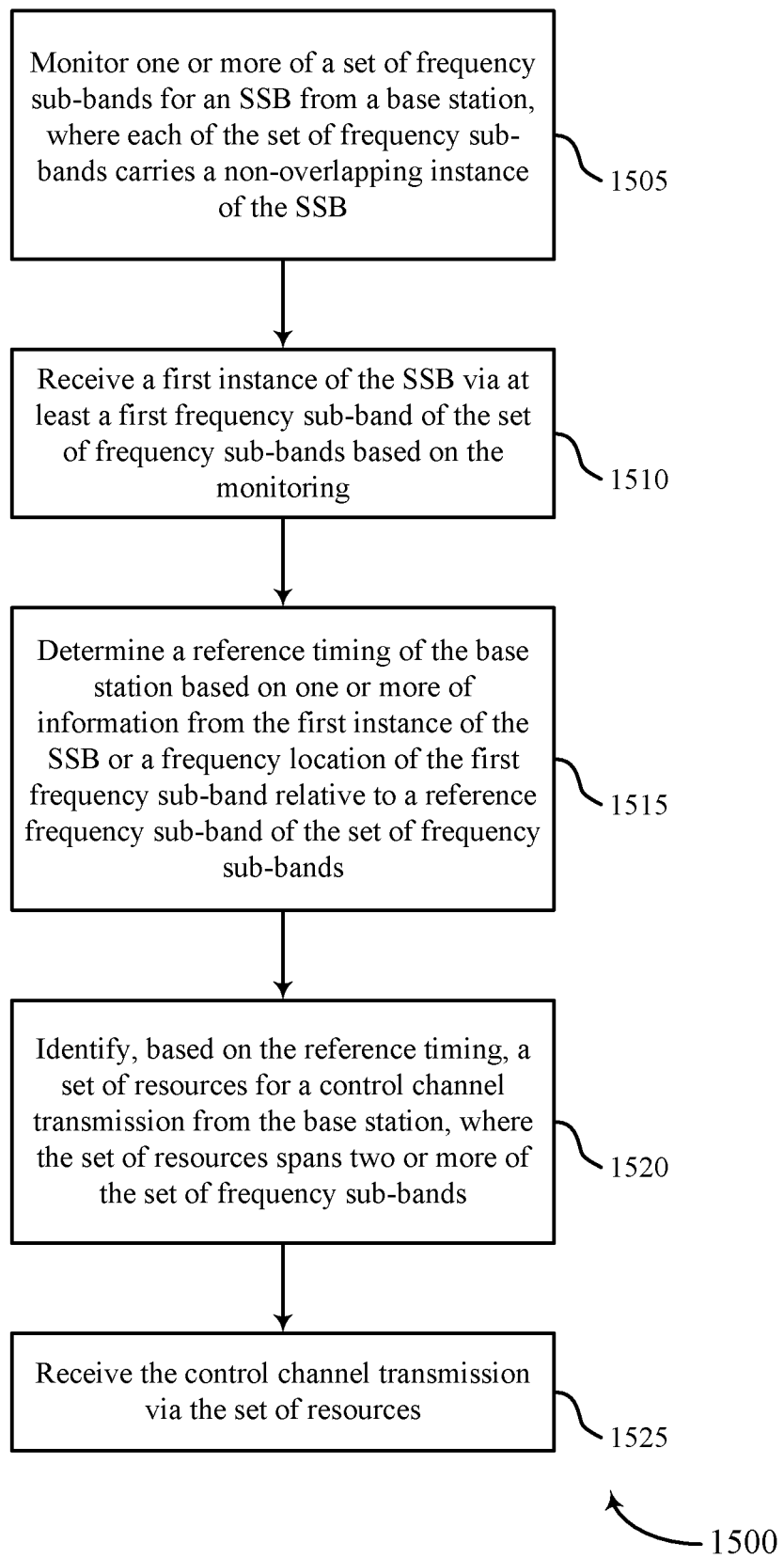
FIGS. 15 through 19 show flowcharts illustrating methods that support staggered SSBs in frequency sub-bands for beamformed wireless communications in accordance with aspects of the present disclosure.

FIG. 15 shows a flowchart illustrating a method 1500 that supports staggered SSBs in frequency sub-bands for beamformed wireless communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may monitor one or more of a set of frequency sub-bands for an SSB from a base station, where each of the set of frequency sub-bands carries a non-overlapping instance of the SSB. The operations of 1505 may be performed according to the methods described herein. In some examples, aspects of the operations of 1505 may be performed by a sub-band identification component as described with reference to FIGS. 7 through 10.

At 1510, the UE may receive a first instance of the SSB via at least a first frequency sub-band of the set of frequency sub-bands based on the monitoring. The operations of 1510 may be performed according to the methods described herein. In some examples, aspects of the operations of 1510 may be performed by an SSB monitoring manager as described with reference to FIGS. 7 through 10.

At 1515, the UE may determine a reference timing of the base station based on one or more of information from the first instance of the SSB or a frequency location of the first frequency sub-band relative to a reference frequency sub-band of the set of frequency sub-bands. The operations of 1515 may be performed according to the methods described herein. In some examples, aspects of the operations of 1515 may be performed by an SSB timing component as described with reference to FIGS. 7 through 10.

At 1520, the UE may identify, based on the reference timing, a set of resources for a control channel transmission from the base station, where the set of resources spans two or more of the set of frequency sub-bands. The operations of 1520 may be performed according to the methods described herein. In some examples, aspects of the operations of 1520 may be performed by an RMSI monitoring manager as described with reference to FIGS. 7 through 10.

At 1525, the UE may receive the control channel transmission via the set of resources. The operations of 1525 may be performed according to the methods described herein. In some examples, aspects of the operations of 1525 may be performed by an RMSI monitoring manager as described with reference to FIGS. 7 through 10.

Figure 16:
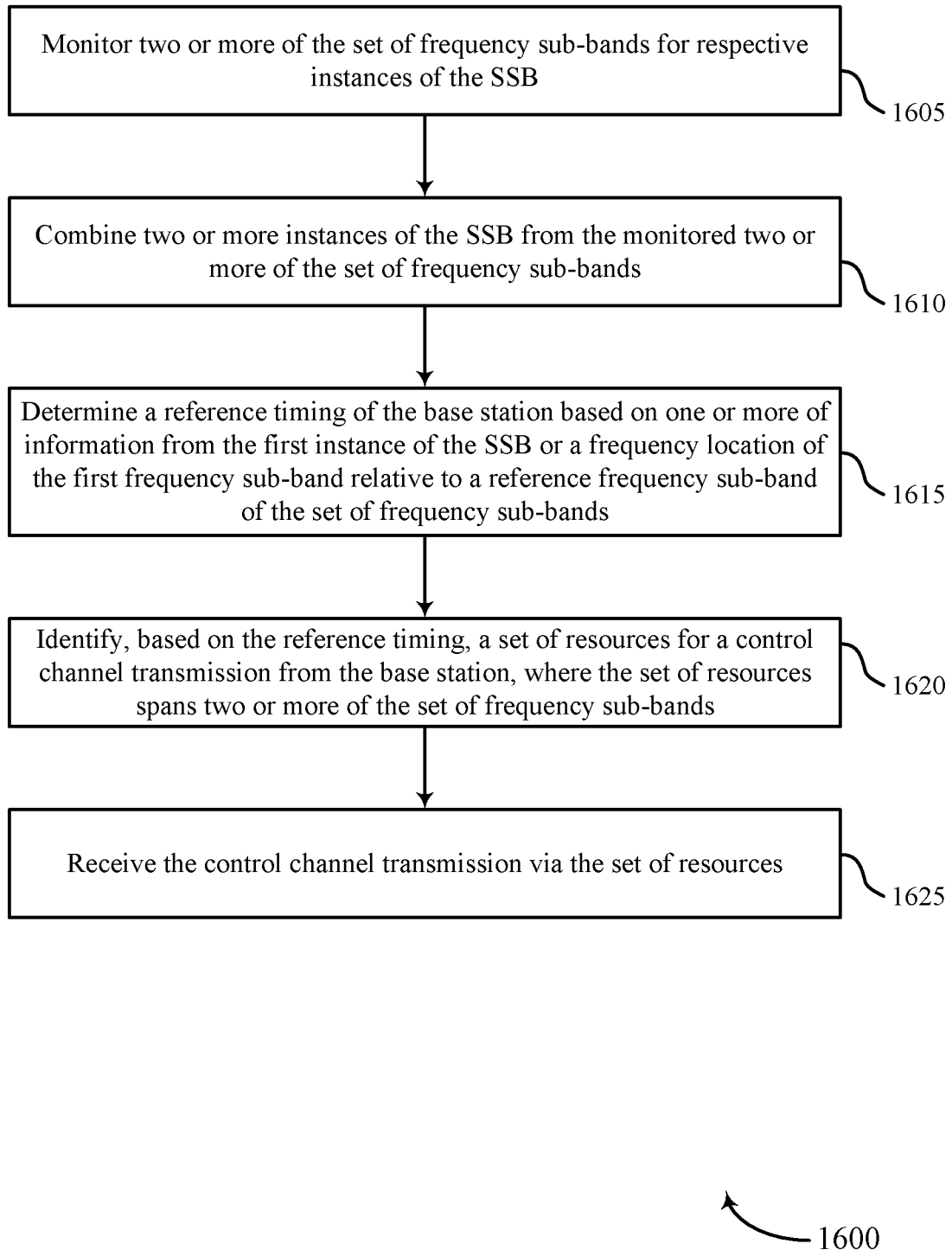

FIG. 16 shows a flowchart illustrating a method 1600 that supports staggered SSBs in frequency sub-bands for beamformed wireless communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may monitor two or more of the set of frequency sub-bands for respective instances of the SSB. The operations of 1605 may be performed according to the methods described herein. In some examples, aspects of the operations of 1605 may be performed by an SSB monitoring manager as described with reference to FIGS. 7 through 10.

At 1610, the UE may combine two or more instances of the SSB from the monitored two or more of the set of frequency sub-bands. The operations of 1610 may be performed according to the methods described herein. In some examples, aspects of the operations of 1610 may be performed by an SSB monitoring manager as described with reference to FIGS. 7 through 10.

At 1615, the UE may determine a reference timing of the base station based on one or more of information from the first instance of the SSB or a frequency location of the first frequency sub-band relative to a reference frequency sub-band of the set of frequency sub-bands. The operations of 1615 may be performed according to the methods described herein. In some examples, aspects of the operations of 1615 may be performed by an SSB timing component as described with reference to FIGS. 7 through 10.

At 1620, the UE may identify, based on the reference timing, a set of resources for a control channel transmission from the base station, where the set of resources spans two or more of the set of frequency sub-bands. The operations of 1620 may be performed according to the methods described herein. In some examples, aspects of the operations of 1620 may be performed by an RMSI monitoring manager as described with reference to FIGS. 7 through 10.

At 1625, the UE may receive the control channel transmission via the set of resources. The operations of 1625 may be performed according to the methods described herein. In some examples, aspects of the operations of 1625 may be performed by an RMSI monitoring manager as described with reference to FIGS. 7 through 10.

Figure 17:
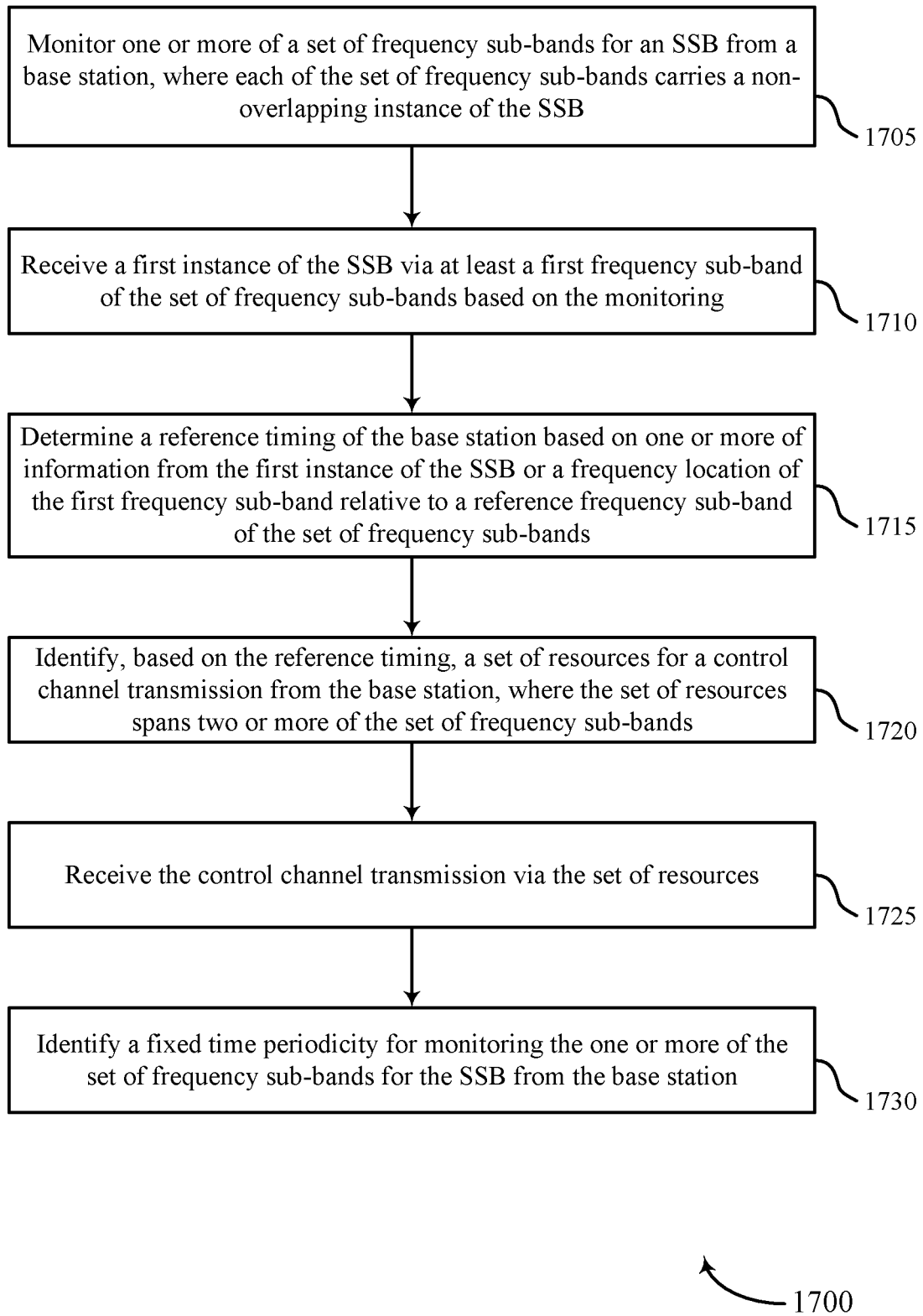

FIG. 17 shows a flowchart illustrating a method 1700 that supports staggered SSBs in frequency sub-bands for beamformed wireless communications in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may monitor one or more of a set of frequency sub-bands for an SSB from a base station, where each of the set of frequency sub-bands carries a non-overlapping instance of the SSB. The operations of 1705 may be performed according to the methods described herein. In some examples, aspects of the operations of 1705 may be performed by a sub-band identification component as described with reference to FIGS. 7 through 10.

At 1710, the UE may receive a first instance of the SSB via at least a first frequency sub-band of the set of frequency sub-bands based on the monitoring. The operations of 1710 may be performed according to the methods described herein. In some examples, aspects of the operations of 1710 may be performed by an SSB monitoring manager as described with reference to FIGS. 7 through 10.

At 1715, the UE may determine a reference timing of the base station based on one or more of information from the first instance of the SSB or a frequency location of the first frequency sub-band relative to a reference frequency sub-band of the set of frequency sub-bands. The operations of 1715 may be performed according to the methods described herein. In some examples, aspects of the operations of 1715 may be performed by an SSB timing component as described with reference to FIGS. 7 through 10.

At 1720, the UE may identify, based on the reference timing, a set of resources for a control channel transmission from the base station, where the set of resources spans two or more of the set of frequency sub-bands. The operations of 1720 may be performed according to the methods described herein. In some examples, aspects of the operations of 1720 may be performed by an RMSI monitoring manager as described with reference to FIGS. 7 through 10.

At 1725, the UE may receive the control channel transmission via the set of resources. The operations of 1725 may be performed according to the methods described herein. In some examples, aspects of the operations of 1725 may be performed by an RMSI monitoring manager as described with reference to FIGS. 7 through 10.

At 1730, the UE may identify a fixed time periodicity for monitoring the one or more of the set of frequency sub-bands for the SSB from the base station. The operations of 1730 may be performed according to the methods described herein. In some examples, aspects of the operations of 1730 may be performed by an SSB timing component as described with reference to FIGS. 7 through 10.

Figure 18:
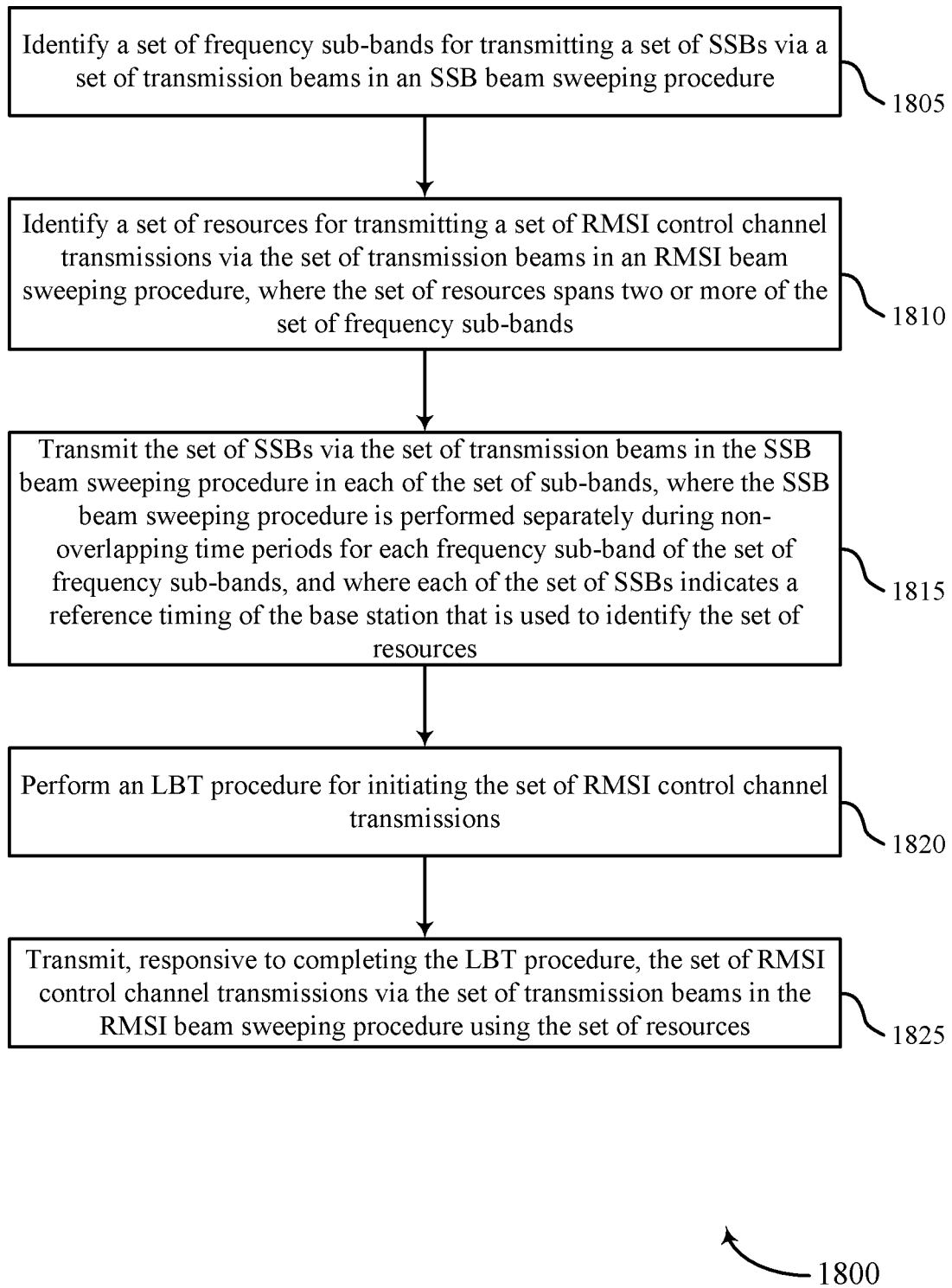

FIG. 18 shows a flowchart illustrating a method 1800 that supports staggered SSBs in frequency sub-bands for beamformed wireless communications in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may identify a set of frequency sub-bands for transmitting a set of SSBs via a set of transmission beams in an SSB beam sweeping procedure. The operations of 1805 may be performed according to the methods described herein. In some examples, aspects of the operations of 1805 may be performed by a sub-band identification component as described with reference to FIGS. 11 through 14.

At 1810, the base station may identify a set of resources for transmitting a set of RMSI control channel transmissions via the set of transmission beams in an RMSI beam sweeping procedure, where the set of resources spans two or more of the set of frequency sub-bands. The operations of 1810 may be performed according to the methods described herein. In some examples, aspects of the operations of 1810 may be performed by an RMSI manager as described with reference to FIGS. 11 through 14.

At 1815, the base station may transmit the set of SSBs via the set of transmission beams in the SSB beam sweeping procedure in each of the set of sub-bands, where the SSB beam sweeping procedure is performed separately during non-overlapping time periods for each frequency sub-band of the set of frequency sub-bands, and where each of the set of SSBs indicates a reference timing of the base station that is used to identify the set of resources. The operations of 1815 may be performed according to the methods described herein. In some examples, aspects of the operations of 1815 may be performed by an SSB manager as described with reference to FIGS. 11 through 14.

At 1820, the base station may perform an LBT procedure for initiating the set of RMSI control channel transmissions. The operations of 1820 may be performed according to the methods described herein. In some examples, aspects of the operations of 1820 may be performed by an LBT manager as described with reference to FIGS. 11 through 14.

At 1825, the base station may transmit, responsive to completing the LBT procedure, the set of RMSI control channel transmissions via the set of transmission beams in the RMSI beam sweeping procedure using the set of resources. The operations of 1825 may be performed according to the methods described herein. In some examples, aspects of the operations of 1825 may be performed by an RMSI manager as described with reference to FIGS. 11 through 14.

Figure 19:
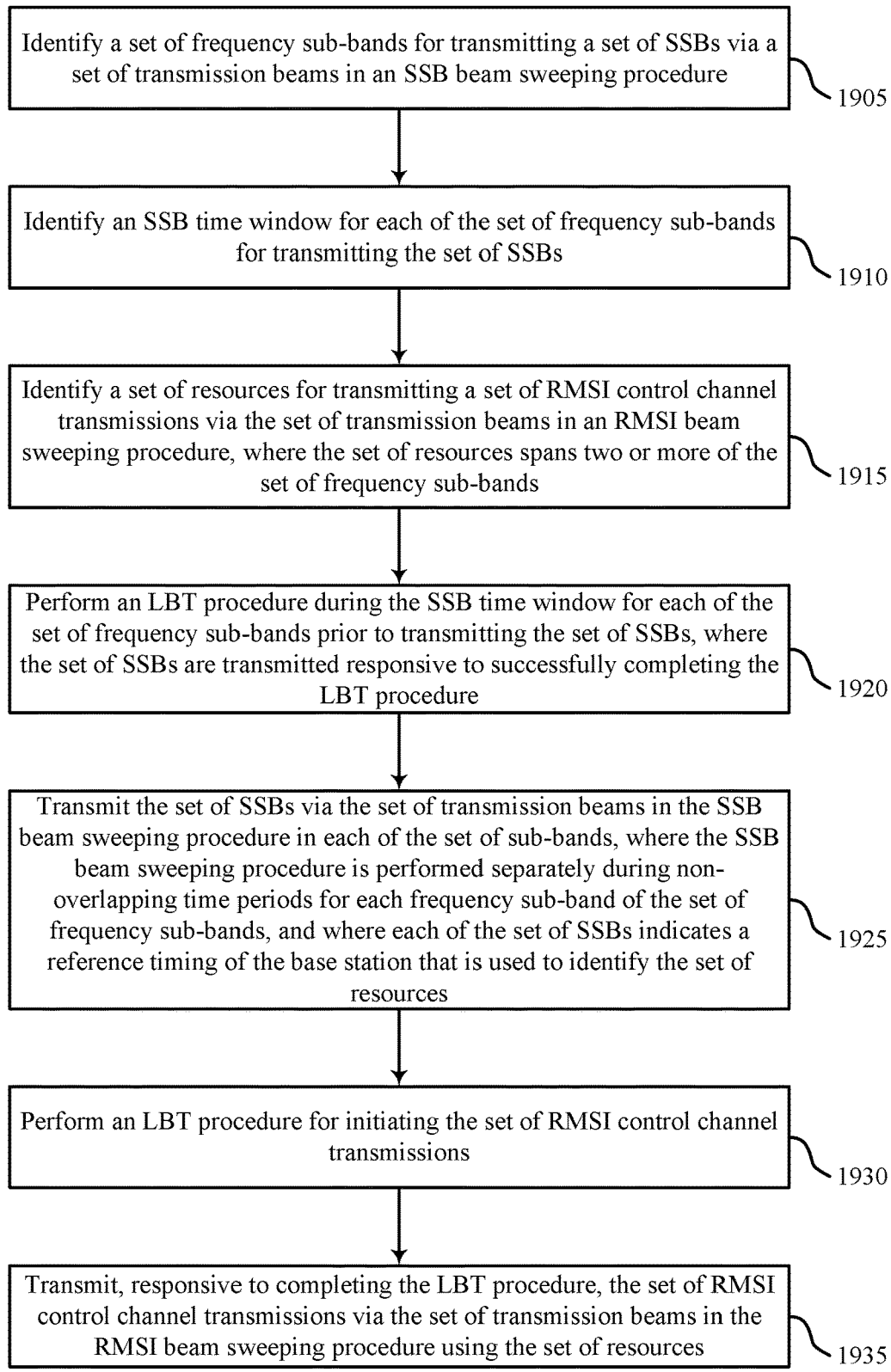

FIG. 19 shows a flowchart illustrating a method 1900 that supports staggered SSBs in frequency sub-bands for beamformed wireless communications in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may identify a set of frequency sub-bands for transmitting a set of SSBs via a set of transmission beams in an SSB beam sweeping procedure. The operations of 1905 may be performed according to the methods described herein. In some examples, aspects of the operations of 1905 may be performed by a sub-band identification component as described with reference to FIGS. 11 through 14.

At 1910, the base station may identify an SSB time window for each of the set of frequency sub-bands for transmitting the set of SSBs. The operations of 1910 may be performed according to the methods described herein. In some examples, aspects of the operations of 1910 may be performed by an SSB manager as described with reference to FIGS. 11 through 14.

At 1915, the base station may identify a set of resources for transmitting a set of RMSI control channel transmissions via the set of transmission beams in an RMSI beam sweeping procedure, where the set of resources spans two or more of the set of frequency sub-bands. The operations of 1915 may be performed according to the methods described herein. In some examples, aspects of the operations of 1915 may be performed by an RMSI manager as described with reference to FIGS. 11 through 14.

At 1920, the base station may perform an LBT procedure during the SSB time window for each of the set of frequency sub-bands prior to transmitting the set of SSBs, where the set of SSBs are transmitted responsive to successfully completing the LBT procedure. The operations of 1920 may be performed according to the methods described herein. In some examples, aspects of the operations of 1920 may be performed by an LBT manager as described with reference to FIGS. 11 through 14.

At 1925, the base station may transmit the set of SSBs via the set of transmission beams in the SSB beam sweeping procedure in each of the set of sub-bands, where the SSB beam sweeping procedure is performed separately during non-overlapping time periods for each frequency sub-band of the set of frequency sub-bands, and where each of the set of SSBs indicates a reference timing of the base station that is used to identify the set of resources. The operations of 1925 may be performed according to the methods described herein. In some examples, aspects of the operations of 1925 may be performed by an SSB manager as described with reference to FIGS. 11 through 14.

At 1930, the base station may perform an LBT procedure for initiating the set of RMSI control channel transmissions. The operations of 1930 may be performed according to the methods described herein. In some examples, aspects of the operations of 1930 may be performed by an LBT manager as described with reference to FIGS. 11 through 14.

At 1935, the base station may transmit, responsive to completing the LBT procedure, the set of RMSI control channel transmissions via the set of transmission beams in the RMSI beam sweeping procedure using the set of resources. The operations of 1935 may be performed according to the methods described herein. In some examples, aspects of the operations of 1935 may be performed by an RMSI manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
monitoring one or more of a plurality of frequency sub-bands for a synchronization signal block (SSB)

from a base station, wherein each of the plurality of frequency sub-bands carries a non-overlapping instance of the SSB;
receiving a first instance of the SSB via at least a first frequency sub-band of the plurality of frequency sub-bands based at least in part on the monitoring;
determining a reference timing of the base station based at least in part on one or more of information from the first instance of the SSB or a frequency location of the first frequency sub-band relative to a reference frequency sub-band of the plurality of frequency sub-bands;
identifying, based at least in part on the reference timing, a set of resources for a control channel transmission from the base station, wherein the set of resources spans two or more of the plurality of frequency sub-bands; and
receiving the control channel transmission via the set of resources.

2. The method of claim 1, wherein the monitoring comprises:
monitoring two or more of the plurality of frequency sub-bands for respective instances of the SSB; and
combining two or more instances of the SSB from the monitored two or more of the plurality of frequency sub-bands.

3. The method of claim 1, further comprising:
identifying a fixed time periodicity for monitoring the one or more of the plurality of frequency sub-bands for the SSB from the base station.

4. The method of claim 1, wherein each of the plurality of frequency sub-bands carries an instance of the SSB that is non-overlapping in time and non-overlapping in frequency.

5. The method of claim 1, further comprising:
identifying an SSB time window for monitoring the one or more of the plurality of frequency sub-bands for the SSB from the base station.

6. The method of claim 5, wherein the SSB is transmitted using an SSB beam sweeping procedure in which a series of consecutive transmission beams within each frequency sub-band each carry a corresponding SSB, and wherein a same initial transmission beam of the series of consecutive transmission beams is used irrespective of when the SSB beam sweeping procedure starts within the SSB time window.

7. The method of claim 5, wherein the SSB is transmitted using an SSB beam sweeping procedure in which a series of consecutive transmission beams each carry a corresponding SSB having an SSB index that indicates a position of the SSB relative to a frame boundary within each frequency sub-band of the plurality of frequency sub-bands.

8. The method of claim 1, wherein each instance of the SSB transmitted via each of the plurality of frequency sub-bands indicates a same set of control resource set (CORESET) resources for the control channel transmission from the base station, and wherein the control channel transmission is a remaining minimum system information (RMSI) physical downlink control channel (PDCCH) transmission.

9. The method of claim 1, wherein an SSB payload of each instance of the SSB indicates the reference timing of the base station relative to the respective instance of the SSB.

10. The method of claim 1, wherein each frequency sub-band of the plurality of frequency sub-bands has a corresponding offset from the reference timing of the base station.

11. The method of claim 1, further comprising:
determining a frequency offset of the set of resources relative to the first frequency sub-band based at least in part on information provided by the first instance of the SSB.

12. The method of claim 1, wherein the set of resources includes a predetermined starting time resource for the control channel transmission relative to the reference frequency sub-band of the plurality of frequency sub-bands.

13. The method of claim 1, wherein the set of resources includes a control channel time window during which the UE is to monitor for the control channel transmission.

14. The method of claim 13, wherein a duration of the control channel time window is based at least in part on a listen-before-talk (LBT) procedure duration and a number of LBT attempts that the base station is configured to perform before dropping the control channel transmission.

15. An apparatus for wireless communications at a user equipment (UE), comprising:
a processor,
memory in electronic communication with the processor; and
instructions stored in the memory, wherein the instructions are executable by the processor to:
monitor one or more of a plurality of frequency sub-bands for a synchronization signal block (SSB) from a base station, wherein each of the plurality of frequency sub-bands carries a non-overlapping instance of the SSB;
receive a first instance of the SSB via at least a first frequency sub-band of the plurality of frequency sub-bands based at least in part on the monitoring;
determine a reference timing of the base station based at least in part on one or more of information from the first instance of the SSB or a frequency location of the first frequency sub-band relative to a reference frequency sub-band of the plurality of frequency sub-bands;
identify, based at least in part on the reference timing, a set of resources for a control channel transmission from the base station, wherein the set of resources spans two or more of the plurality of frequency sub-bands; and
receive the control channel transmission via the set of resources.

16. The apparatus of claim 15, wherein the instructions executable by the processor to monitor comprise instructions executable by the processor to:
monitor two or more of the plurality of frequency sub-bands for respective instances of the SSB; and
combine two or more instances of the SSB from the monitored two or more of the plurality of frequency sub-bands.

17. The apparatus of claim 15, wherein the instructions are further executable by the processor to:
identify a fixed time periodicity for monitoring the one or more of the plurality of frequency sub-bands for the SSB from the base station.

18. The apparatus of claim 15, wherein each of the plurality of frequency sub-bands carries an instance of the SSB that is non-overlapping in time and non-overlapping in frequency.

19. The apparatus of claim 15, wherein the instructions are further executable by the processor to:
identify an SSB time window for monitoring the one or more of the plurality of frequency sub-bands for the SSB from the base station.

20. The apparatus of claim 19, wherein the SSB is transmitted using an SSB beam sweeping procedure in which a series of consecutive transmission beams within each frequency sub-band each carry a corresponding SSB, and wherein a same initial transmission beam of the series of consecutive transmission beams is used irrespective of when the SSB beam sweeping procedure starts within the SSB time window.

21. The apparatus of claim 19, wherein the SSB is transmitted using an SSB beam sweeping procedure in which a series of consecutive transmission beams each carry a corresponding SSB having an SSB index that indicates a position of the SSB relative to a frame boundary within each frequency sub-band of the plurality of frequency sub-bands.

22. The apparatus of claim 15, wherein each instance of the SSB transmitted via each of the plurality of frequency sub-bands indicates a same set of control resource set (CORESET) resources for the control channel transmission from the base station, and wherein the control channel transmission is a remaining minimum system information (RMSI) physical downlink control channel (PDCCH) transmission.

23. The apparatus of claim 15, wherein an SSB payload of each instance of the SSB indicates the reference timing of the base station relative to the respective instance of the SSB.

24. The apparatus of claim 15, wherein each frequency sub-band of the plurality of frequency sub-bands has a corresponding offset from the reference timing of the base station.

25. The apparatus of claim 15, wherein the instructions are further executable by the processor to:
   determine a frequency offset of the set of resources relative to the first frequency sub-band based at least in part on information provided by the first instance of the SSB.

26. The apparatus of claim 15, wherein the set of resources includes a predetermined starting time resource for the control channel transmission relative to the reference frequency sub-band of the plurality of frequency sub-bands.

27. The apparatus of claim 15, wherein the set of resources includes a control channel time window during which the UE is to monitor for the control channel transmission.

28. The apparatus of claim 27, wherein a duration of the control channel time window is based at least in part on a listen-before-talk (LBT) procedure duration and a number of LBT attempts that the base station is configured to perform before dropping the control channel transmission.

* * * * *